(12) United States Patent
Mattox et al.

(10) Patent No.: US 7,200,868 B2
(45) Date of Patent: Apr. 3, 2007

(54) APPARATUS FOR ENCRYPTION KEY MANAGEMENT

(75) Inventors: Mark D. Mattox, Lawrenceville, GA (US); Anthony J. Wasilewski, Alpharetta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 915 days.

(21) Appl. No.: 10/242,100

(22) Filed: Sep. 12, 2002

(65) Prior Publication Data

US 2004/0052377 A1    Mar. 18, 2004

(51) Int. Cl.
G06F 7/04 (2006.01)
G06F 17/30 (2006.01)
H04L 9/00 (2006.01)

(52) U.S. Cl. .................... 726/26; 726/27; 713/165; 380/278

(58) Field of Classification Search ................. 713/193
See application file for complete search history.

(56) References Cited

U.S. PATENT DOCUMENTS 5,878,141 A * 3/1999 Daly et al. ................ 705/78
5,933,498 A   8/1999 Schneck et al. ........... 380/4
6,021,491 A * 2/2000 Renaud ..................... 713/179
6,157,719 A   12/2000 Wasilewski et al. ....... 380/21
2002/0169958 A1 * 11/2002 Nyman et al. ............. 713/168
2003/0093680 A1 * 5/2003 Astley et al. .............. 713/183
2003/0204738 A1 * 10/2003 Morgan ..................... 713/194
2003/0226023 A1 * 12/2003 Peters ....................... 713/193

OTHER PUBLICATIONS

Scientific-Atlanta, Inc. Pending U.S. Appl. No. 10/015,351, filed Dec. 11, 2001, Title: "Encrypting Received Content," Inventors: Howard G. Pinder and Jeffrey C. Hopper.
International Standard ISO/IEC 11172-1: 1993, Technical Corrigendum 2, "Information Technology—Coding of Moving Pictures and Associated Audio for Digital Storage Media at Up to About 1,5 Mbit/s—Part 1: Systems," published Nov. 15, 1999, pp. 1-53.
International Standard ISO/IEC 13818-1: 2000, Technical Corrigendum 1, "Information Technology—Generic Coding of Moving Pictures and Associated Audio Information: Systems," published Mar. 1, 2002, pp. 1-154.

* cited by examiner

*Primary Examiner*—Gilberto Barrón, Jr.
*Assistant Examiner*—Christopher J Brown

(57) ABSTRACT

An apparatus and a receiver, which is in a broadband communication system, includes the logic necessary for protecting keys used for encrypting content that is received by the receiver. The apparatus validates the keys and denies the receiver the use of the keys if they become invalid.

53 Claims, 10 Drawing Sheets

APPARATUS FOR ENCRYPTION KEY MANAGEMENT

CROSS-REFERENCE TO RELATED APPLICATION

This application is related to copending U.S. patent application Ser. No. 10/015,351, entitled "ENCRYPTING RECEIVED CONTENT," which was filed on Dec. 11, 2001, and is hereby entirely incorporated herein by reference.

FIELD OF THE INVENTION

This invention relates generally to broadband communications systems, such as subscriber television systems, and more specifically to securing encryption keys within the broadband communication system.

BACKGROUND OF THE INVENTION

Frequently, broadband systems transmit television signals and programs to subscribers of a conditional access system. Broadband systems, such as cable and satellite television systems, typically include a headend for receiving programming and/or data from various sources and redistributing the programming and other data through a distribution system to subscribers. The headend receives programming signals from a variety of sources, combines the programming signals from the various sources, and transmits the combined signals through the distribution system to subscriber equipment. The distribution system can include a variety of media, such as coaxial cable, fiber optic cable, and satellite links. In a subscriber television system, the subscriber equipment, which receives the signals from the headend, can include a cable-ready television, a cable-ready video cassette recorder (VCR), or a digital subscriber communications terminal (DSCT) that is connected to a television, computer, or other display device.

The headend uses modulators to control the streams of data into the distribution system. Increasingly, the headend is receiving and transmitting programming in a digital format, for example, Moving Pictures Expert Group (MPEG) format, instead of an analog format. Transmitting programs in MPEG format is advantageous because multiple digitized programs can be combined and transmitted in, for example, 6 MHz of bandwidth, which is the same amount of bandwidth that is required to transmit a single analog channel or program, and in comparison to analog programs, MPEG or digitized programs provide a cleaner and sharper image and sound. Various error correction schemes enable the digital packets to be transmitted through a digital network with minimal distortion or error.

In theory, the packets of a digital program can be reproduced or copied without error. Thus, a subscriber of a digital subscriber network who receives a digital program can record the program and copy it, and the copy will be virtually identical to the original. Therefore, there exists concern about illegal copying or bootlegging of digital content. The operators of a digital subscriber network and the content providers want to provide the subscribers of the digital network with the programming and services desired by the subscribers, but the digital content owners want to prevent the subscribers from making and distributing bootleg copies of the digitized programs and services. Thus, there exists a need for an apparatus that protects the property interests of the digital content owners, while providing the subscribers with the desired digital content.

DETAILED DESCRIPTION OF PREFERRED EMBODIMENTS

Figure 1:
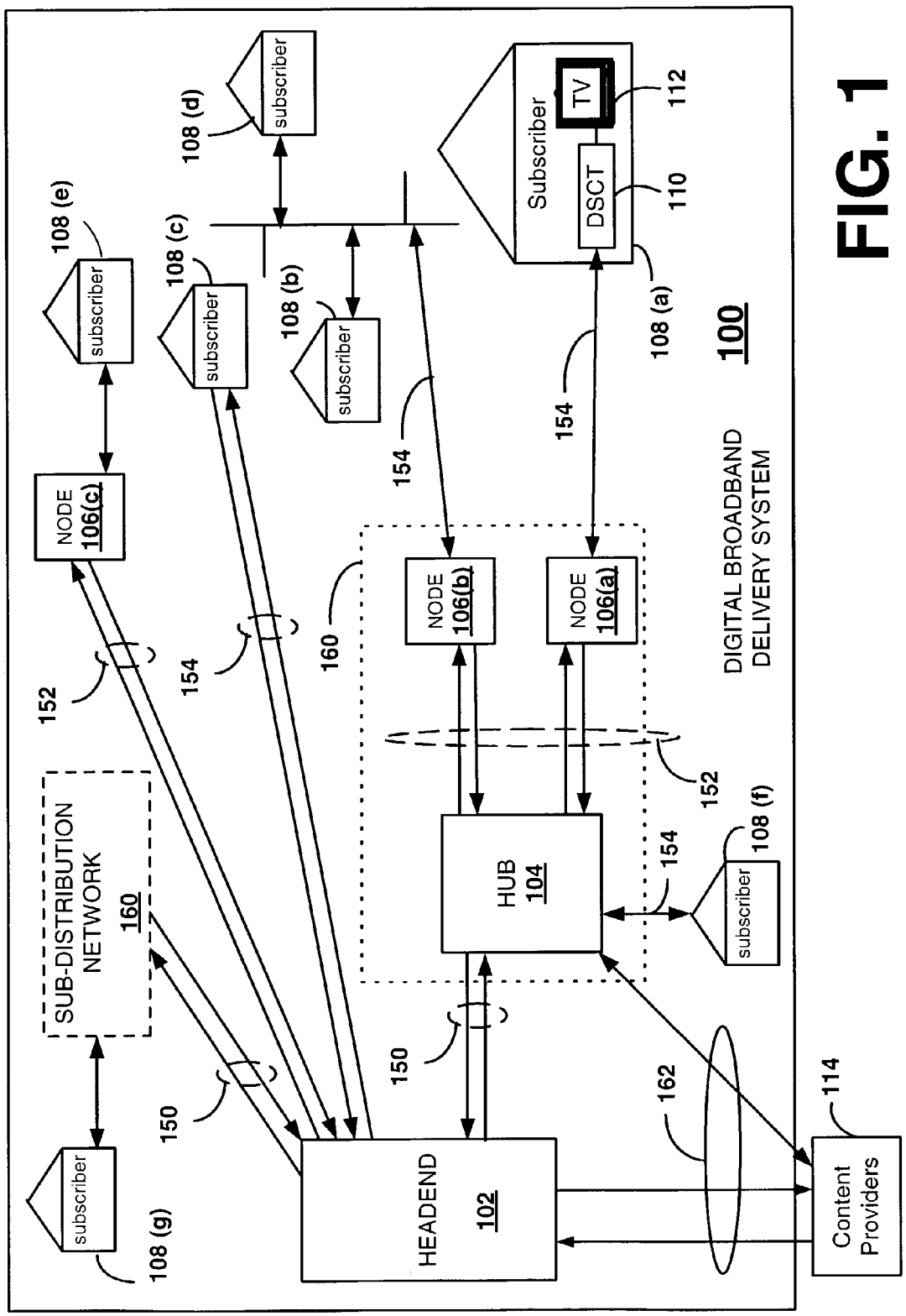
FIG. 1 is a broadband communications system, such as a cable television system, in which the embodiments of the present invention may be employed.

Embodiments of the present invention will be described more fully hereinafter with reference to the accompanying drawings in which like numerals represent like elements throughout the several figures, and in which an exemplary embodiment of the invention is shown. The present invention may, however, be embodied in many different forms and should not be construed as limited to the embodiments set forth herein. The examples set forth herein are non-limiting examples and are merely examples among other possible examples.

The logic of the present invention can be implemented in hardware, software, firmware, or a combination thereof. In the preferred embodiment(s), the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Television System Overview

The preferred embodiment of the invention is best understood within the context of a two-way, interactive digital subscriber television system or a digital subscriber network, as an example. In this discussion, the two-way interactive digital subscriber television system is also referred to as a Digital Broadband Delivery System (DBDS). An overview of an exemplary DBDS is provided in U.S. Pat. No. 6,157, 719, entitled "Conditional Access System", which is hereby incorporated by reference herein in its entirety. A function of the DBDS is to provide interfaces to content and service providers, entitlement agents, control access to and the use of the content and services, and to distribute the content and services to subscribers. The DBDS uses Motion Picture Experts Group (MPEG) transport streams for delivery of video, audio, and digitized data entertainment services. MPEG as referenced in this application is described in the MPEG-1 and MPEG-2 standards. The MPEG-1 standards (ISO/IEC 11172) and the MPEG-2 standards (ISO/IEC 13818) are described in detail in the International Organization for Standardization document ISO/IEC JTC1/SC29/WG11 N (June 1996 for MPEG-1 and July 1996 for MPEG-2), which is hereby incorporated by reference. The content and services distributed to the subscribers can include programming and services such as local television channels, premium movie channels, video-on-demand (VOD), telephone services, Internet access, and audio programming, among others.

Referring to FIG. 1, a digital broadband distribution system (DBDS) 100 includes, in one example among others, a headend 102, a plurality of hubs 104, multiple nodes 106, a plurality of subscriber locations 108, and a plurality of digital subscriber communication terminals (DSCTs) 110. The headend 102 provides the interface between the DBDS 100 and content and service providers 114, such as broadcasters, internet service providers, and the like via communication link 162. The transmission medium 162 between the headend 102 and the content and service providers 114 can be two-way. This allows for two-way interactive services such as Internet access via DBDS 100, video-on-demand, interactive program guides, etc. In the preferred embodiment, the hubs 104 are also in direct two-way communication with the content and service providers 114 via communication link 162 for providing two-way interactive services.

In the preferred embodiment, the headend 102 is in direct communication with the hubs 104 via communication link 150. In addition, the headend 102 can be in direct communication with some or all of the nodes 106 via communication link 152 or in direct communication with some or all of the subscriber locations 108 via communication link 154. Whether the headend 102 communicates directly with nodes 106 and/or subscriber locations 108 is a matter of implementation. The hub 104 receives programming and other information from headend 102 via transmission medium 150, typically in an Ethernet medium and transmits information and programming via transmission medium 152 to nodes 106, which then transmit the information to subscriber locations 108 through transmission medium 154. Again, whether the hub 104 communicates directly to subscriber locations 108 or to nodes 106 is matter of implementation, and in the preferred embodiment, the hub 104 is also adapted to transmit information and programming directly to subscriber locations 108 via transmission medium 154.

In the preferred embodiment, the transmission medium 150 and 152 are optical fibers that allow the distribution of high quality and high-speed signals, and the transmission medium 154 is either broadband coaxial cable or optical fiber. In alternative embodiments, the transmission media 150, 152 and 154 can incorporate one or more of a variety of media, such as optical fiber, coaxial cable, and hybrid fiber-coax (HFC), satellite, direct broadcast, or other transmission media known to those skilled in the art. Typically, the transmission media 150, 152 and 154 are two-way communication media through which both in-band and out-of-band information are transmitted. Through the transmission media 150, 152 and 154 subscriber locations 108 are in direct or indirect two-way communication with the headend 102 and/or the hub 104.

The hub 104 functions as a mini-headend for the introduction of programming and services to sub-distribution network 160. The sub-distribution network 160 includes hub 104 and the plurality of nodes 106 connected to hub 104. Having a plurality of hubs 104 that function as mini-headends facilitates the introduction of different programming, data and services to different sub-distribution networks of DBDS 100. For example, the subscriber location 108(b), which is connected to node 106(b), can have different services, data and programming available than the services, data and programming available to subscriber location 108(c), which is connected directly to headend 102, even though the subscriber locations 108(b) and 108(c) may be in close physical proximity to each other. Services, data and programming for subscriber location 108(b) are routed through hub 104 and node 106(b); and hub 104 can introduce services, data and programming into the DBDS 100 that are not available through the headend 102.

At the subscriber locations 108 a decoder or a DSCT 110 provides the two-way interface between the DBDS 100 and the subscriber. The DSCT 110 decodes and further process the signals for display on a display device, such as a television set (TV) 112 or a computer monitor, among other examples. Those skilled in the art will appreciate that in alternative embodiments the equipment for decoding and further processing the signal can be located in a variety of equipment, including, but not limited to, a DSCT, a computer, a TV, a monitor, or an MPEG decoder, among others.

As will be explained in detail hereinbelow, secure communication between the headend 102 and the DSCTs 110 is accomplished using pairs of asymmetrical keys known to those skilled in the art, such as Rivest, Shamir, & Adleman (RSA) public key encryption technology. Briefly described, an asymmetrical key pair includes a public key, which is distributed to the public, and a private key, which is not distributed. Content that is encrypted with a public key can only be decrypted using the corresponding private key. A message that is signed with a private key is authenticated with the corresponding public key. Thus, after headend 102 and the DSCT 110 have exchanged public keys they can securely communicate. The content of a message for the particular DSCT 110 is encrypted using the public key of the particular DSCT 110, and only the particular DSCT 110 that has the corresponding private key can decrypt the content of the message. The message can also be signed by the private key of the headend 102, and in that case the DSCT 110 uses the public key of the headend 102 to authenticate the message. For details regarding cryptography that a reasonably skilled person would understand see, Bruce Schneier, "*Applied Cryptography*", John Wiley & Sons, 1994.

Headend

Figure 2:
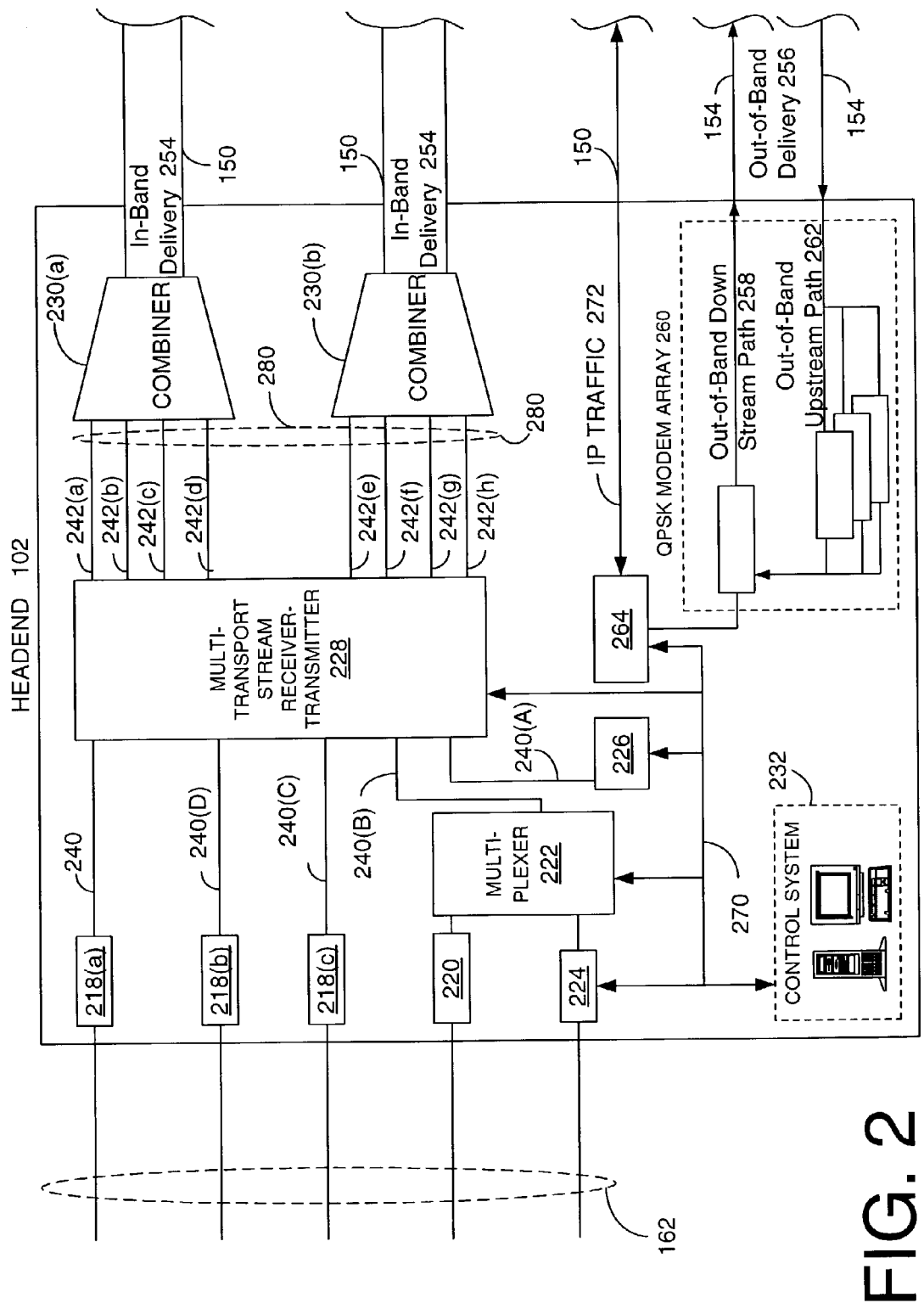
FIG. 2 is a headend in the broadband communication system in which embodiments of the present invention may be employed.

Referring to FIG. 2, in a typical system of the preferred embodiment of the invention, the headend 102 receives content from a variety of input sources, which can include, but are not limited to, a direct feed source (not shown), a video camera (not shown), an application server (not shown), and other input sources (not shown). The input signals are transmitted from the content providers 114 to the headend 102 via a variety of communication links 162, which include, but are not limited to, satellites (not shown), terrestrial broadcast transmitters (not shown) and antennas (not shown), and direct lines (not shown). The signals provided by the content providers, or entitlement agents, can include a single program or a multiplex that includes several programs, and typically, a portion of the content from the input sources is encrypted.

The headend 102 generally includes a plurality of receivers 218 that are each associated with a content source. Generally, the content is transmitted from the receivers 218 in the form of transport stream 240. MPEG encoders, such as encoder 220, are included for digitally encoding things such as local programming or a feed from a video camera. Typically, the encoder 220 produces a variable bit rate transport stream. Some of the signals may require additional processing, such as signal multiplexing prior to being modulated. Such multiplexing is done by multiplexer 222.

A switch, such as asynchronous transfer mode (ATM) switch 224, provides an interface to an application server (not shown). There can be multiple application servers providing a variety of services such as, among others, a data service, an Internet service, a network system, or a telephone system. Service and content providers 114 (shown in FIG. 1) may download content to an application server located within the DBDS 100 or in communication with DBDS 100. The application server may be located within headend 102 or elsewhere within DBDS 100, such as in a hub 104.

Typically, the headend 102 includes a server such as a video-on-demand (VOD) pump 226. VOD pump 226 provides video and audio programming such as VOD pay-per-view programming to subscribers of the DBDS 100. Usually, the content from VOD pump 226 is provided in the form of transport stream 240.

The various inputs into the headend 102 are then combined with the other information, which is specific to the DBDS 100, such as local programming and control information. The headend 102 includes a multi-transport stream receiver-transmitter 228 that receives a plurality of transport streams 240 and transmits a plurality of transport streams 242. In the preferred embodiment, the multi-transport stream receiver-transmitter 228 includes a plurality of modulators, such as, but not limited to, Quadrature Amplitude Modulation (QAM) modulators, that convert the received transport streams 240 into modulated output signals suitable for transmission over transmission medium 280.

The output signals 242 from the multi-transport stream receiver-transmitters 228 are combined, using equipment such as a combiner 230, for input into the transmission medium 150, and the combined signals are sent via the in-band delivery path 254 to subscriber locations 108. It is to be understood that modulating the output signals 242 is a matter of implementation based at least in part on the transmission medium 280 that carries output signals 242.

In the preferred embodiment, the multi-transport stream receiver-transmitter 228 receives a plurality of input transport streams 240, which include programs, or sessions, and outputs a plurality of radio frequency modulated transport streams 242. In the DBDS 100, video, audio, and control information are encoded as program streams, which are then multiplexed to form transport streams 240. Each output transport stream from multi-transport stream receiver-transmitter 228 is modulated to a set frequency. For the DSCT 110 (shown in FIG. 1) to receive a television program, in the preferred embodiment, among others, the DSCT 110 tunes to the frequency associated with the modulated transport stream that contains the desired information, de-multiplexes the transport stream, and decodes the appropriate program streams.

A system controller, such as control system 232, which preferably includes computer hardware and software providing the functions discussed herein, allows the DBDS system operator to control and monitor the functions and performance of the DBDS 100. The control system 232 interfaces with various components, via communication link 270, in order to monitor and/or control a variety of functions, including the channel lineup of the programming for the DBDS 100, billing for each subscriber, and conditional access for the content distributed to subscribers. Control system 232 provides input to the multi-transport stream receiver-transmitter 228 for setting its operating parameters, such as system specific MPEG table packet organization or conditional access information.

Control information and other data can be communicated to DSCTs 110 via the in-band delivery path 254 or to DSCTs 110 connected to the headend 102 via an out-of-band delivery path 256. The out-of-band data is transmitted via the out-of-band downstream path 258 of transmission medium 154 by means such as, but not limited to, a Quadrature Phase-Shift Keying (QPSK) modem array 260, an array of data-over-cable service interface specification (DOCSIS) modems, or other means known to those skilled in the art. Two-way communication utilizes the upstream portion 262 of the out-of-band delivery system. DSCTs 110 transmit out-of-band data through the transmission medium 154, and the out-of-band data is received in headend 102 via out-of-band upstream paths 262. The out-of-band data is routed through router 264 to an application server or to the VOD pump 226 or to control system 232. Out-of-band control information includes such information as a pay-per-view purchase instruction and a pause viewing command from the subscriber location 108 (shown in FIG. 1) to a video-on-demand type application server, and other commands for establishing and controlling sessions, such as a Personal Television session, etc. The QPSK modem array 260 is also coupled to communication link 152 (FIG. 1) for two-way communication with the DSCTs 110 coupled to nodes 106.

The router 264 is used for communicating with the hub 104 through transmission medium 150. Typically, command and control information among other information between the headend 102 and the hub 104 are communicated through transmission medium 150 using a protocol such as but not limited to Internet Protocol. The IP traffic 272 between the headend 102 and hub 104 can include information to and from DSCTs 110 connected to hub 104.

The control system 232, such as Scientific-Atlanta's Digital Network Control System (DNCS), as one acceptable example among others, also monitors, controls, and coordinates all communications in the subscriber television system, including video, audio, and data. The control system 232 can be located at headend 102 or remotely.

In the preferred embodiment, the multi-transport stream receiver-transmitter 228 is adapted to encrypt content prior to modulating and transmitting the content. Typically, the content is encrypted using a cryptographic algorithm such as the Data Encryption Standard (DES) or triple DES (3DES), Digital Video Broadcasting (DVB) Common Scrambling or other cryptographic algorithms or techniques known to those skilled in the art. The multi-transport stream receiver-transmitter 228 receives instructions from the control system 232 regarding the processing of programs included in the input transport streams 240. Sometimes the input transport streams 240 include programs that are not transmitted downstream, and in that case the control system 232 instructs the multi-transport stream receiver-transmitter 240 to filter out those programs. Based upon the instructions received from the control system 232, the multi-transport stream receiver-transmitter 228 encrypts some or all of the programs included in the input transport streams 240 and then includes the encrypted programs in the output transport streams 242. Some of the programs included in input transport stream 240 do not need to be encrypted, and in that case the control system 232 instructs the multi-transport stream transmitter-receiver 228 to transmit those programs without encryption. The multi-transport stream receiver-transmitter 228 sends the DSCTs 110 the keys that are needed to decrypt the encrypted program. It is to be understood that for the purposes of this disclosure a "program" extends beyond a conventional television program and that it includes video, audio, video-audio programming and other forms of services and digitized content. "Entitled" DSCTs 110 are allowed to use the keys to decrypt encrypted content, details of which are provided hereinbelow.

In the preferred embodiment, the multi-transport stream receiver-transmitter 228 is also adapted to decrypt encrypted content or ciphertext. For the purposes of this disclosure, ciphertext refers to encrypted content, without regard to the source of the content. In other words, the content can be text, video, audio, or any source of content. Sometimes the content provided by the content providers 114 is encrypted, and the multi-transport stream receiver-transmitter 228 applies an encryption function of a cryptographic algorithm to the ciphertext to convert the ciphertext to a different ciphertext, and other times it converts the ciphertext to cleartext, i.e., unencrypted content. As with ciphertext, cleartext can be text, video, audio, or any source of information or content. In the context of this disclosure, cleartext is used to refer to non-encrypted content, not to the type of content.

In the preferred embodiment, the hub 104, which functions as a mini-headend, includes many or all of the same components as the headend 102. The hub 104 is adapted to receive the transport-streams 242 included in the in-band path 254 and redistribute the content therein throughout its sub-distribution network 160. The hub 104 includes a QPSK modem array (not shown) that is coupled to communication links 152 and 154 for two-way communication with DSCTs 110 that are coupled to its sub-distribution network 160. Thus, it is also adapted to communicate with the DSCTs 110 that are coupled to its sub-distribution network 160, with the headend 102, and with the content providers 114.

Figure 3:
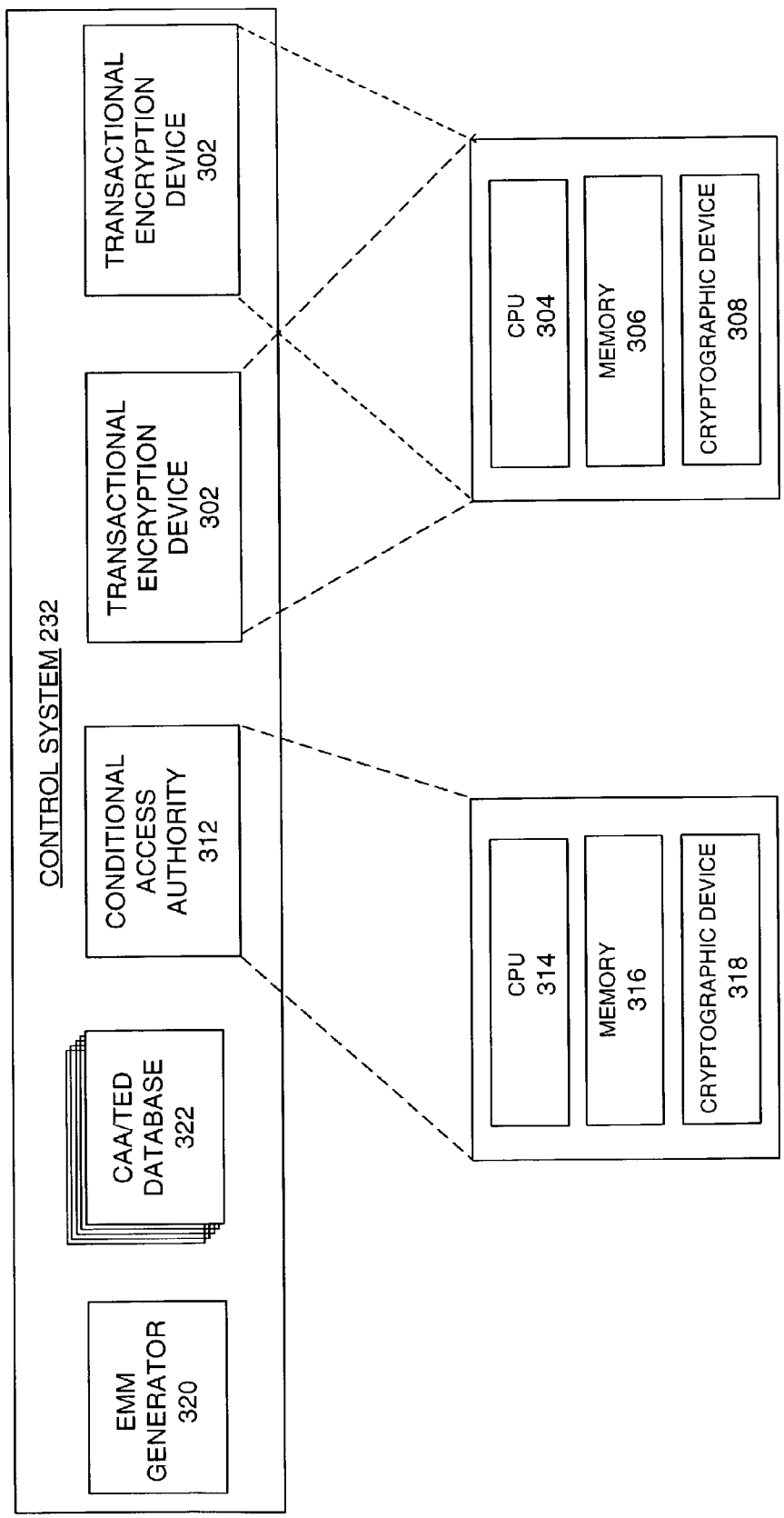
FIG. 3 is a block diagram of a control system.

Referring to FIG. 3, the control system 232 includes, among other components, transaction encryption devices (TEDs) 302, a conditional access authority (CAA) 312, an Entitlement Management Message (EMM) generator 320 and a CAA/TED database 322. The CAA/TED database 322 includes the public keys and the serial numbers of the DSCTs 110 within the DBDS 100. Each DSCT 110 in the DBDS 100 has a unique serial number, and the serial number, which can be the IP address of the DSCT 110, is used for addressing messages to the DSCT 110. The public key of each DSCT 110 and its serial number are copied when the DSCT 110 is manufactured. In the preferred embodiment, the manufacturer provides a copy of the public key and the serial number of each DSCT 110 to the control system 232. In that case, the manufacturer is a key certification authority that certifies to the operator of the DBDS 100 that a given public key belongs to a specific DSCT 110 (and the control system 232 verifies the certificate to be authentic before placing it into the database of DSCTs 110). In one embodiment, the public keys of the DSCTs 110 are included in messages transmitted from the DSCTs 110 to the control system 232, and the public keys are then stored to the CAA/TED database 322, and the control system 232 verifies the certificate to be authentic before placing it into the database of DSCTs 110.

In the preferred embodiment, the CAA/TED database 322 includes a per-TED database. The per-TED database includes encryption information for each TED 302, such as, but not limited to, current information regarding keys used for encrypting content provided to the DSCTs 110 and expiration times for those keys. The CAA/TED database 322 also includes a per-DSCT database, which includes entitlement information for each DSCT 110 in the DBDS 100. The per-DSCT database can also include customer billing information such as the information required to bill a subscriber for a VOD pay-per-view program or instance of service.

The EMM generator 320 generates message templates that are provided to the CAA 312 and the TEDs 302. The CAA 312 and the TEDs 302 fill in the necessary information to create EMMs that are used for, among other things, controlling access to DSCTs 110, establishing a TED 302 with a DSCT 110, providing limited authority for a TED 302 within the DBDS 100, providing entitlements to a DSCT 110 for programs and instances of service associated with a TED 302 and disestablishing a TED 302 with a DSCT 110. Details of EMMs are provided in U.S. Pat. No. 6,157,719, entitled "Conditional Access System", which is hereby incorporated by reference herein in its entirety. The EMM generator 320 generates EMM templates for both the CAA 312 and the TEDs 302.

In the preferred embodiment, each TED 302 is associated with an entitlement agent, which provides content to the DBDS 100. Typically, there is one entitlement agent for the DBDS 100. The entitlement agent receives or generates content that is provided to the DSCTs 110. For example, the content from the entitlement agent can include, but is not limited to, television programming from content owners such as NBC, HBO, CBS, ABC, etc., audio programming, computer programs, audio information from telephone services, and information from the Internet. In the preferred embodiment of the invention, multiple entitlement agents are allowed to provide content to the DSCTs 110 of the DBDS 100. In an alternative embodiment, there is only one TED 302 for the DBDS 100 and the functionality of the CAA 312 and the TED 302 are combined into a single apparatus. In yet another embodiment, the TED 302 and the CAA 312 are fully integrated into the control system 232, such that a central processing unit (not shown) of the control system 232 implements the necessary logic for providing the functionality of the TED 302 and CAA 312.

Each TED 302 is used for, among other things, generating encryption information used by the multi-transport stream receiver-transmitter 228 for encrypting content, programs or instances of service, provided to the DSCTs 110 and generating decryption information used by the DSCTs 110 for decrypting the received programs or instances of service. The TED 302 generates a multi-session key (MSK), which is used as part of the encryption and decryption process.

The EMM generator 320 provides the TED 302 with an EMM template addressed to a specific DSCT 110, and the TED 302 processes the EMM template to include the MSK in the EMM. The information included in the EMM can also be entitlement information for the DSCT 110 for the programs or instances of service provided by the entitlement agent associated with the TED 302. In the preferred embodiment, the EMMs are transmitted via the out-of-band path 256. The TED 302 provides the EMM to the QPSK modem array 260, which then transmits the EMM to the DSCT 110.

In an alternative embodiment, the EMMs are transmitted in-band, and in that case the TED 302 provides the EMM to the multi-transport stream receiver-transmitter 228, which transmits the EMM to the DSCT 110. The MSK is also stored to the CAA/TED database 322 and it is provided to the multi-transport stream receiver-transmitter 228. Details of the EMMs and MSKs are provided hereinbelow.

In the preferred embodiment, a particular TED 302 has at least one public key private key pair and it uses the private key for signing and decrypting messages. In the preferred embodiment, some or all of the DSCTs 110 in DBDS 100 will have the public key of a particular TED 302, and the particular TED 302 will have access to public keys from some or all of the DSCTs 110. The public key of the particular TED 302 is given to a given DSCT 110 when the particular TED 302 is established with the given DSCT 110. A TED 302 that is established with a DSCT 110 is allowed to provide content or programs or instances of service to the DSCT 110. Establishment of a TED 302 with a DSCT 110 is controlled by the conditional access authority (CAA) 312 of system controller 232.

The TED 302 includes a central processing unit (CPU) 304, a cryptographic accelerator 1, and a memory 306, which has the private key (or private keys) of the TED 302 stored therein. The memory 306 also includes the logic necessary for performing the functions of the TED 302, such as authenticating received messages, and generating hash digests or authentication tokens. The CPU 304 also uses logic included in the memory 306 to perform the functions of the TED 302. When the CPU 304 generates an authentication token, it employs a secure one-way hash function on some content, such as a message, to generate a hash digest of that content. A one-way secure hash is a cryptographic operation where an input is run through some mathematical operations to produce an output, the hash digest, which is of fixed-length and which is probably unique. The hash digest has at least two properties: (1) determining the input to the hash function, given the hash digest, is virtually impossible or is at least computationally difficult; and (2) a hash digest for an input is essentially unique. The probability that two different inputs will result in the same output is extremely small. All of the hash digests discussed in this disclosure are generated from secure one-way hash functions.

The TED 302 uses EMMs to communicate entitlements and MSKs for programs or instances of service to the DSCTs 110. The TED 302 receives an EMM template from the EMM generator 320 addressed to a specific DSCT 110. The CPU 304 completes the template, generates a hash digest of the message content and includes the hash digest as an authentication token in the EMM. The CPU 304 retrieves the public key of the specific DSCT 110 from the CAA/TED database 322, and the content of the EMM is encrypted by the cryptographic accelerator 308 using that public key. Typically, the authentication token is signed by the cryptographic accelerator 308 using the private key of the TED 302. The EMM is signed so that the specific DSCT 110 can confirm that the EMM did in fact come from the TED 302.

The TED 302 can also receive messages from the DSCT 110. If a message was signed by a given DSCT 110, the CPU 304 gets the public key of the given DSCT 110 from the CAA/TED database 322, and the cryptographic accelerator 308 authenticates that the message did in fact come from the DSCT 110. If the message includes content that was encrypted by the public key of the TED 302, then the cryptographic accelerator 308 uses the private key of the TED 302 to decrypt the content of the message. Frequently, the portion of the message that was signed is a hash digest of the message. In that case, the CPU 304 can generate a hash digest of the decrypted content of the message and compare the generated hash digest with the received hash digest. If both digests are the same, then the CPU 304 determines that the message was not corrupted in transmission nor tampered with.

The CAA 312 is the trusted cryptographic authority in the DBDS 100, which means that any message that is signed by the private key of the CAA 312 is to be considered by the recipient of that message as a valid or authentic message. As the trusted authority, the CAA 312, among other things, certifies the public keys of the TEDs 302. The CAA 312 includes a central processing unit (CPU) 314, a memory 316 and a cryptographic accelerator 318. The memory 316 includes three public key-private key pairs for the CAA 312, which are used by the CPU 314 for digitally signing EMMs and establishing and disestablishing TEDs 302 with DSCTs 110. The EMMs are signed so that the recipient of an EMM knows that the EMM came from the CAA 312. Each of the private keys can be also used for decrypting messages that have been encrypted by the corresponding public key of the CAA 312.

The DSCTs 110 are provided with the public keys of the CAA 312 so that they can authenticate EMMs coming from the CAA 312. In the preferred embodiment, the public key of the CAA 312 is included in the DSCT 110 as part of the manufacturing process of the DSCT 110. In an alternative embodiment, the public key of the CAA 312 is provided to the DSCTs 110 after the DSCT 110 has been manufactured and prior to the DSCT 110 being installed in the DBDS 100.

The memory 316 also includes the logic necessary for performing the functions of the CAA 312, such as authenticating received messages and generating hash digests or authentication tokens. The CPU 314 uses logic included in the memory 316 to perform the functions of the CAA 312.

The CAA 312 communicates commands and information to the DSCTs 110 through EMMs. The CAA 312 receives an EMM template from the EMM generator 320 for a specific DSCT 110. The CPU 314 completes the template according to the type of command or information that it wants to convey. For example, the CPU 314 can command a DSCT 110 to establish a TED 302 or disestablish an established TED. Then the CPU 314 generates a hash digest of the message content and includes the digest as an authentication token in the EMM. Typically, the authentication token is signed by the cryptographic accelerator 318 using the private key of the CAA 312 so that the specific DSCT 110 can confirm that the EMM did in fact come from the CAA 312. When it is necessary for the content of the EMM to be protected, the CPU 314 gets the public key of the specific DSCT 110 from the CAA/TED database 322, and, in that case, the content of the EMM is encrypted by the cryptographic accelerator 318 using the public key of the DSCT 110.

To establish a TED 302 with a DSCT 110, the CAA 312 sends an EMM to a particular DSCT 110 with instructions for allocating a portion of its memory to a given TED 302. Because the DSCT 110 already has the public key of the CAA 312, the DSCT 110 can authenticate the EMM as having come from the CAA 312. The CAA 312 provides the DSCT 110 with the public key of the TED 302 in an EMM, thereby establishing the TED 302 in the DSCT 110. Now that the DSCT 110 has the public key of the TED 302, the DSCT 110 and the TED 302 can securely communicate. The CAA 312 can also disestablish the TED 302, by sending the DSCT 110 an EMM telling the DSCT 110 that the DSCT 110 should no longer allocate any of its memory to the TED 302.

For details of allocating and configuring memory in the DSCTs see U.S. Pat. No. 5,742,677, Pinder, et al., Information Terminal Having Reconfigurable Memory, filed Apr. 3, 1995, which is incorporated by reference in its entirety.

The CAA 312 can also receive messages from the DSCT 110. If the message was signed by the DSCT 110, the CPU 314 gets the public key of the DSCT 110 from the CAA/TED database 322 and the cryptographic accelerator 318 authenticates that the message did in fact come from the DSCT 110. If the message included content that was encrypted by the public key of the CAA 312, then the cryptographic accelerator 318 uses the private key of the CAA 312 to decrypt the content of the message.

The CAA 312 also grants limited authority within the DBDS 100 to the TED 302 and controls the types of services that the TED 302 can provide the DSCT 110. In a non-limiting example, the CAA 312 can determine that the TED 302 is entitled to provide interactive television services but not Internet services. Among other methods, the CAA 312 controls the types of services that the TED 302 can provide by the allocation of memory in the DSCT 110.

Transport Stream

The programs and instance of services provided by the entitlement agents are included in transport streams 240 and 242, which include packets of information. An instance of service includes, but is not limited to, a video service, an audio service, and a television program such as the Evening News. The preferred embodiment of the invention shall describe the packets of information as MPEG packets, but this is for illustrative purposes only and is a non-limiting example. The present invention is not limited to MPEG packets.

Figure 4:
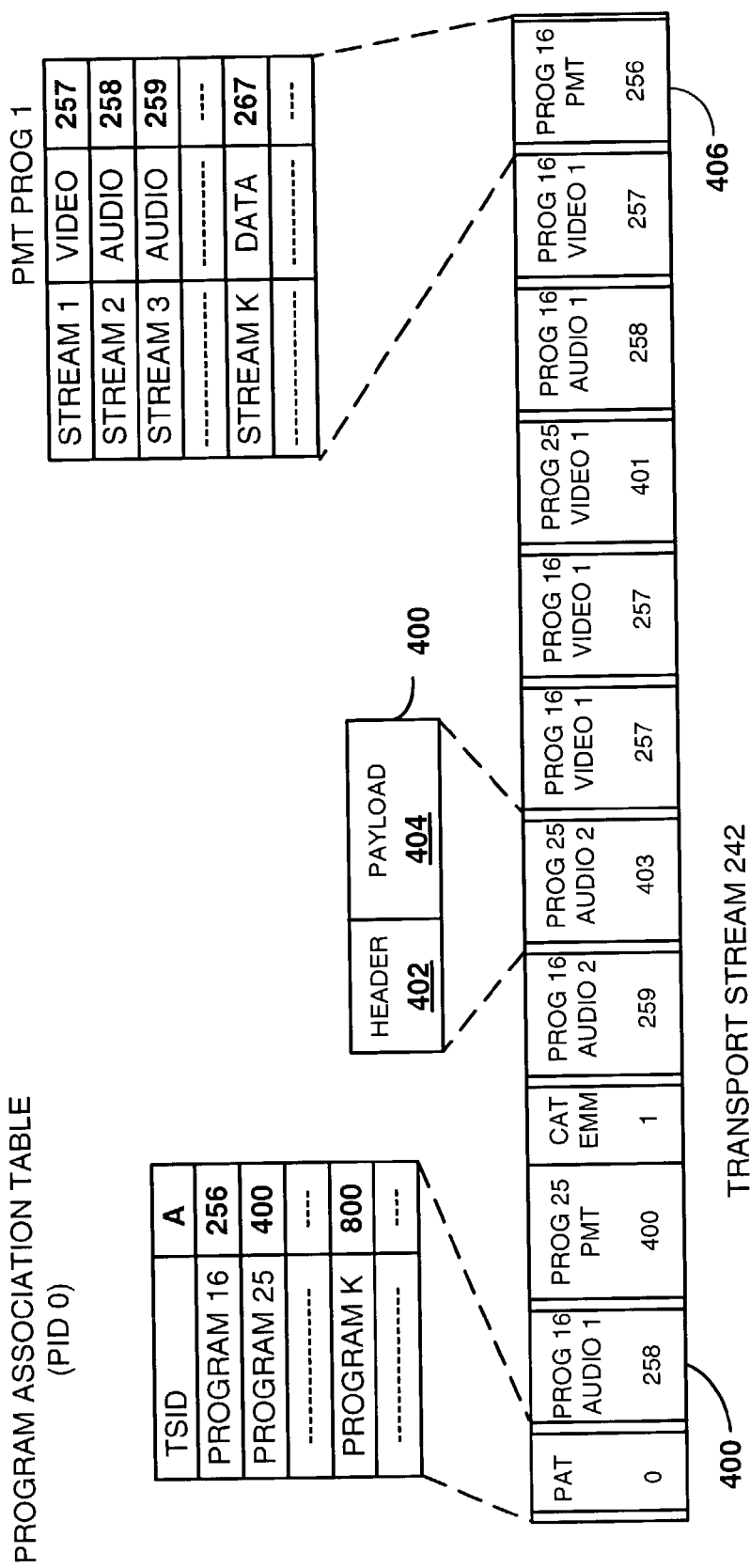
FIG. 4 is a block diagram representation of an MPEG transport stream.

Referring to FIG. 4, for the sake of clarity a brief description of network transport stream 242 is provided hereinbelow. Network transport stream 242, which is a representative MPEG transport stream, is made up of a plurality of MPEG packets 400. Each of the MPEG packets 400 has a header 402 and a payload 404. The header 402 includes a packet identifier (PID) 406 that is used to identify the packet. Certain packets, such as program association tables (PATs), which are identified by the PID value of 0, have reserved PID values. PATs are used to associate programs with program map tables (PMTs), which are used to identify the PID values of the elementary streams of the programs. For example, the exemplary PAT shown in FIG. 4, associates a program number 16 with a PMT packet having a PID value of 256. Generally, a program is made up of a plurality of elementary streams, and each one of the elementary streams in transport stream 242 has a unique PID value. The exemplary PMT, shown in FIG. 4, lists the elementary streams and their respective PID values.

System Encryption Scheme

Figure 5:
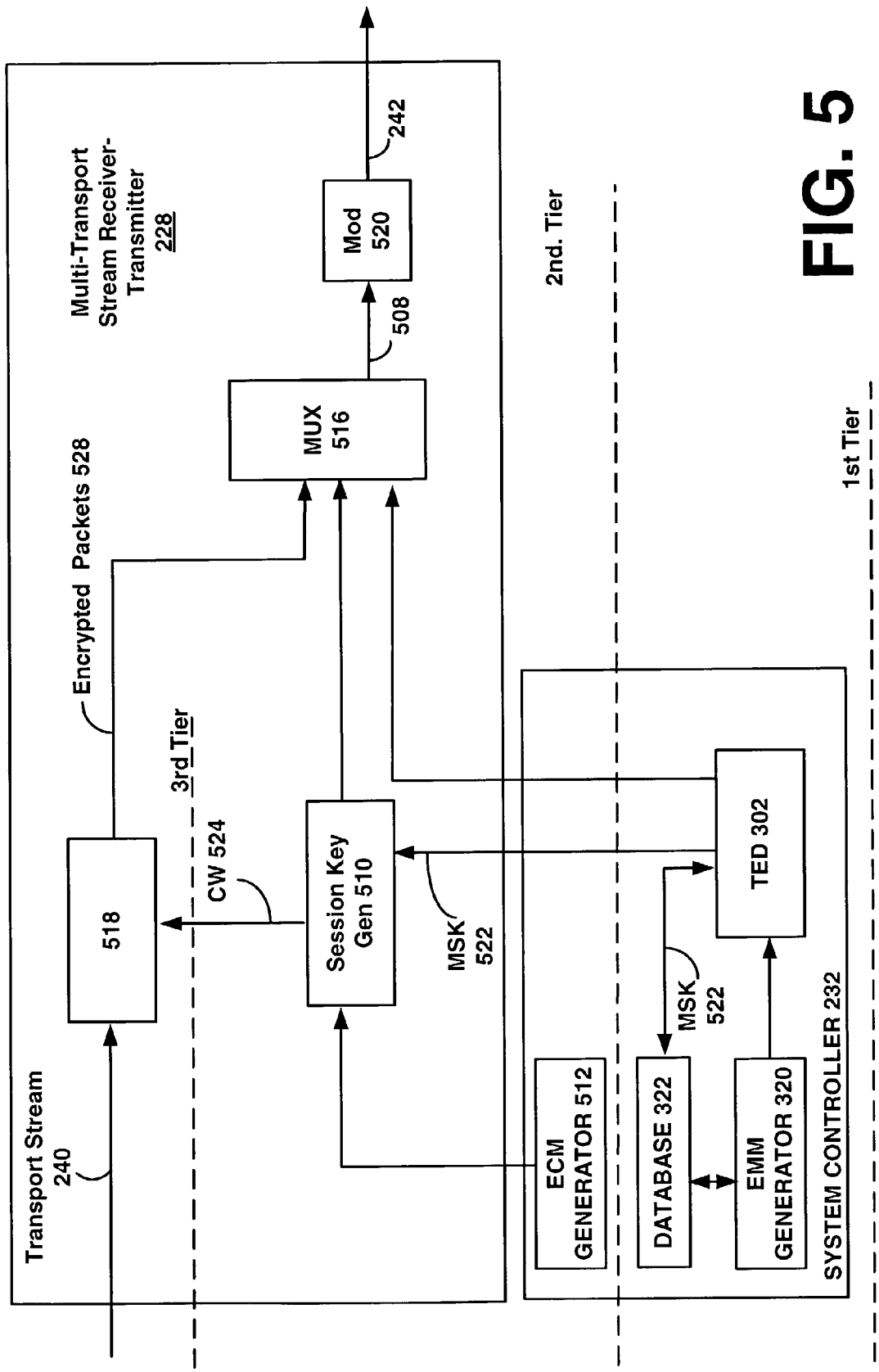
FIG. 5, illustrates the levels of security in the broadband communication system at the headend.

Referring to FIG. 5, the encryption scheme implemented in the DBDS 100 is a multi-tiered scheme. In the preferred embodiment, CPU 304 and memory 306 of the TED 302 includes the logic necessary to perform the functions related to generating long-term keys or multi-session keys (MSKs).

The first tier has the highest tier of security in the DBDS 100, this tier is used for, without limitation, establishing the TED 302 of an entitlement agent with a DSCT 110, creating the entitlements of the TED 302 in the DSCT 110, providing the DSCT 110 with the entitlements to access programs and instances of services, and providing the DSCT 110 with multi-session keys (MSKs) used for accessing the entitled instances of service and programs.

The second tier is related to the generation and transmission of relatively short term keys, or control words, control words being keys that are changed less frequently than the MSK. The control words are not as well protected as the MSKs, but they are changed so frequently that the security of the DBDS 100 is not seriously comprised if a control word is stolen. Generally, the control words are changed every couple of seconds, in one implementation. In that case, a single stolen key will decrypt at most only a couple of seconds of unauthorized access.

The third tier is the lowest tier of encryption. The content of transport stream 240 is encrypted using a symmetrical cryptographic algorithm such as DES, 3DES, DVB common scrambling, or other encryption schemes known to those skilled in the art. Symmetrical cryptographic algorithms are chosen for the speed by which the encryption and decryption can be accomplished at the headend 102 and at the DSCT 110.

At the headend 102, the first tier includes portions of the system controller 232, including the EMM generator 320, the CAA/TED database 322, the CAA 312 and the TED 302. The EMM generator 320 creates EMM templates for both the TEDs 302 and the CAA 312. The CAA 312 or the TEDs 302 determine whether the EMM contains information that needs to be protected during transmission, and if it does, the content of the EMM is encrypted. Sometimes the content of the EMM does not need to be encrypted such as when the content is a public key. (Public keys are given out to the public, so there is no reason to protect them by encryption.) The CAA 312 and the TEDs 302 handle EMMs in the same manner, so a description of how the CAA 312 handles EMMs is not provided.

In the preferred embodiment, the EMM messages are the most secure messages transmitted through the DBDS 100. The EMMs are used by the TED 302 to provide, among other things, each DSCT 110, for which the TED 302 is established, with decryption information, such as MSKs, for programs or instances of service and authorization that are necessary for the DSCT 110 to access a program or instance of service that is associated with the TED 302. For example, if a subscriber decides to order a pay-per-view movie, the subscriber receives an EMM that includes the necessary authorizations for the DSCT 110 of the subscriber to access the ordered pay-per-view movie. EMMs are also used, for among other things, for distributing MSKs. Generally, MSKs have an expiration date, and as such new MSKs need to be sent before the expiration of the current MSK. Each DSCT 110 that is associated with the TED 302 receives an EMM having a new MSK prior to the expiration of the current MSK.

The EMM generator 320 includes the logic necessary for checking the CAA/TED database 322 and determining the expiration date of the current MSK for the TED 302, and then addressing the EMM template for each DSCT 110 that is associated with the TED 302.

The TED 302 receives an EMM template, which is addressed to one of the DSCTs 110 associated with the TED 302, and the CPU 302 implements logic stored in the memory 306 for implementing a multi-session key generator (not shown), which is used for generating multi-session keys (MSKs) 522.

The CPU 304 creates an MSK 522, which is then used as part of the encryption/decryption scheme implemented in DBDS 100, and copies of the MSK 522 are sent to the CAA/TED database 322, along with its expiration date, and to the multi-transport stream receiver-transmitter 228. In an alternative embodiment, a copy of the MSK 522 is sent to the CAA/TED database 322, and the multi-transport stream receiver-transmitter 228 retrieves the MSK 522 from the CAA/TED database 322 when it needs it.

The CPU 304 employs a one-way hash function using a portion or all of the MSK to produce a hash digest. The hash is used as an authentication token. The DSCT 110 that receives the MSK in an EMM can determine whether the EMM was corrupted in transmission by creating another hash digest of the EMM and comparing its hash digest with the received authentication token. If the two are the same, then the EMM was not corrupted. In the preferred embodiment, the cryptographic accelerator 308 uses the private key of the TED 302 to sign the authentication token. The content of the message is then encrypted by the CPU 304 using the public key of the DSCT 110, and the encrypted content, or ciphertext, and the signed authentication token are included in the EMM, which is sent to the DSCT 110. Thus, the EMM having the MSK has two levels of security: the encrypted content and the signed authentication token.

Each time the MSK generator 504 produces a new MSK 522, the MSK 522 is sent to the control word generator 510 and to the per-TED database of the CAA/TED database 322 along with its expiration. The MSK 522 is changed as frequently as the operators of DBDS 100 desire to do so.

Each DSCT 110 of the DBDS 100 has its own public key-private key pair, and the EMM's content is frequently encrypted using the public key of the DSCT 110 to which the EMM is addressed. (It is not necessary to encrypt the content of all of the EMMs. Some EMMs are used to transmit copies of public keys that don't need to be kept secret. However, these EMMs include an authentication token is used to protect the content of these messages.) Consequently, only the particular DSCT 110 that an EMM is addressed to has the correct private key for decrypting the EMM. The particular DSCT 110 decrypts the encrypted content using its private key and validates the signature of the TED 302 applied to the authentication token using the public key of the TED 302. The DSCT 110 then creates a hash digest of at least a portion of the contents of the EMM and compares the hash digest with the received authentication token. Provided the produced hash digest and the received authentication token are the same, the DSCT 110 then knows that the EMM has not been tampered with or corrupted in transmission. If the content of the EMM was altered, then the hash digest and the authentication token will not be the same, and in that case, the EMM is ignored. EMMs addressed to the DSCT 110 are repeatedly sent, and therefore, if an EMM is corrupted in transmission, an uncorrupted EMM should arrive at the DSCT shortly.

At the headend 102, the second and third tiers are preferably implemented in the system controller 232 and the multi-transport stream receiver-transmitter 228. The system controller 232 includes an entitlement control message (ECM) generator 512, which is used for generating ECM templates, and the ECM templates include information that associates the ECM template with a particular TED 302 and with a program or instance of service provided by the entitlement agent associated with the particular TED 302. The ECM template also includes information about the entitlements that are needed by the DSCTs 110 to access the associated program or instance of service. A DSCT 110 that receives the ECM for an associated program or instance of service checks its authorizations for programs or instances of service, and only if the DSCT 110 has the proper authorization will the DSCT 110 use the ECM to access the program or instance of service.

Due to efficiency concerns, symmetric cryptographic algorithms are employed for encrypting the packets 400 of the transport stream 240 and the content of the ECMs. Those skilled in the art recognize that symmetric cryptographic algorithms are generally faster than asymmetrical cryptographic algorithms, but symmetric cryptographic algorithms can also be less secure, because a mechanism is required to provide the same key to both the encryptor and decryptor. However, the security of the DBDS 100 is not at risk. As previously stated hereinabove, the control word 524, which is used as the encryption key, is frequently changed. Preferably it is changed every couple of seconds. Therefore, gaining access to a particular instance of service requires knowledge of multiple control words; more than 1,000 control words are used for an instance of service that lasts for one hour in which the control word is replaced every 3.5 seconds. Symmetric cryptographic algorithm include, but are not limited to, DES, 3DES and DVB Common Scrambling.

The multi-transport stream transmitter receiver 228 includes, at least, a control word generator 510, a multiplexer 516, a cryptographic device 518, and a modulator 520. The control word generator 510 produces a control word 524, which is provided to the cryptographic device 518 as a key to be used with a function of a cryptographic algorithm. The control word 524 can be either a number produced by a random number generator (not shown) or a "pseudo-random" number. In the preferred embodiment, the count of a sequential counter (not shown) is encrypted to produce a pseudo-random number or the control word 524. The control word generator 510 receives the MSK 522 from the TED 302 and uses the MSK to encrypt the counter value. In the preferred embodiment, the counter value is encrypted using a cryptographic algorithm such as 3DES, or other symmetrical cryptographic algorithms.

The control word generator 510 produces ECMs that are sent to the DSCTs 110 using an ECM template received from the ECM generator 512. The ECMs include the counter value, which is transmitted in the clear, and an authentication token produced by the control word generator 510. The counter value is a token of the control word 524, and the DSCT 110 uses the counter value to generate its control word for decrypting service instances.

The authentication token is a one-way hash digest of at least a portion of the ECM, such as the counter value, and a secret that is shared with the DSCTs 110. The secret is the MSK 522, which the established DSCTs have already received via an EMM. In the preferred embodiment, the control word generator 510 creates a new control word 524 every few seconds. Each time a new control word 524 is produced, the control word generator 510 provides the cryptographic device 518 with the new control word 524 and includes the new counter value in a new ECM, which is then sent to the DSCTs 110. In an alternative embodiment, the authentication token is a one-way hash digest of at least a portion of the MSK 522, the control word 524 and the message content of the ECM.

In an alternative embodiment, a true random number is used as the control word 524. In that case, the random number is encrypted by a symmetrical cryptographic algorithm using the MSK as a key and the encrypted control word is included in the ECM. A hash digest using at least the control word 524 is produced by the control word generator 510 and included in the ECM. The control word 524 is provided to the cryptographic device 518, and the ECM is sent to the DSCTs 110. The random number generator produces a new control word 524 every couple of seconds;

and the new control word 524 is provided to the cryptographic device 518, and a new ECM having the new control word 524 included therein is created and sent to the DSCTs 110.

The cryptographic device 518 receives the control word 524 and uses it to encrypt the packets of transport stream 240. In the preferred embodiment, the cryptographic device 518 is adapted to perform both encryption and decryption functions of a cryptographic algorithm such as DES, or 3DES, or DVB common scrambling, and other cryptographic algorithms known to those skilled in the art. Thus, when input transport stream 240 includes encrypted content, the cryptographic device 518 can apply a function of a cryptographic algorithm to further encrypt the content, i.e., add another layer or encryption to the content, or apply a function of a cryptographic algorithm to remove a layer of encryption. Typically, the control system 232 provides the multi-transport stream transmitter-receiver 228 with the keys that are used by the cryptographic device 518 to remove a layer of encryption. In the preferred embodiment, some of the content of the input transport streams 240 is encrypted with a key different than the control word 524, and in that case, the control system 232 provides the multi-transport stream transmitter-receiver 228 with the encryption key.

Typically, the cryptographic device 518 receives the transport stream 240 and applies a function of the cryptographic algorithm with the control word to the content of transport stream 240. The cryptographic device 518 applies a function of a cryptographic algorithm to the payload 404 of the packet 400 using the control word 524 as the key, thereby converting the packets 400 of transport stream 240 into encrypted packets 528.

The multi-transport stream transmitter receiver 228 includes a multiplexer 516 and a modulator 520. In one embodiment, the multiplexer 516 receives EMMs from the TED 302, ECMs from the control word generator 510, and encrypted packets 528 and multiplexes them into transport stream 508. The modulator 520 receives the transport stream 508 and outputs modulated transport stream 242, which is then received by the DSCTs 110.

Subscriber Location 108

To prevent unauthorized access to (or copying of) programs or instances of service transmitted to the DSCTs 110, the programs or instances of service are encrypted at the DSCT 110 prior to storing the program or instance of service at the subscriber's location 108. In the preferred embodiment, the key or keys used for encrypting the program or instance of service are then restricted such that the keys work only with the DSCT 110 that recorded the program or instance of service. Another method for restricting access to the key(s) used for decrypting programs or instances of service is for the headend or the content provider 114 to control the key(s).

DSCT 110

The DSCT 110 receives programming or instances of service from the headend 102. The DSCT 110 is adapted to respond to user commands to process the received programs or instances of service such that programs or instances of service can be provided to a user device such as, but not limited to, the television 112. The DSCT 110 is also adapted to process programs or instances of service and store the programs or instances of service at the subscriber's location 108. Three examples for encrypting and storing the content of a program or instance of service at the subscriber's location are described hereinbelow. These examples are non-limiting examples for illustrative purposes only and those skilled in the art will recognize other embodiments, which are intended to be included within the scope of the invention. However, first a description of the DSCT 110 and a description how the DSCT 110 receives and processes a program or instance of service are provided.

Figure 6:
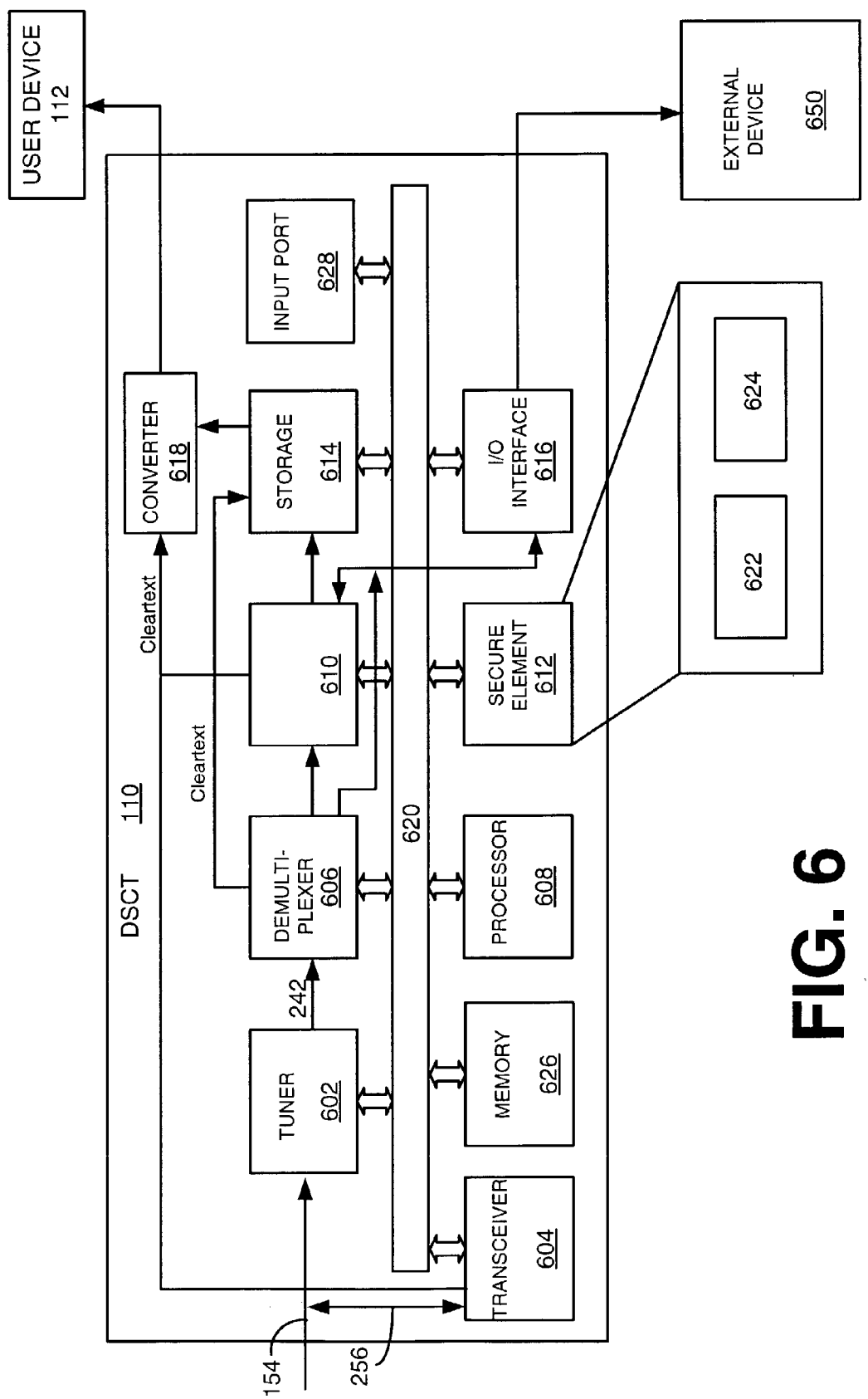
FIG. 6 is a block diagram of the digital subscriber communication terminal.

Referring to FIG. 6, the DSCT 110 is coupled to communication link 154, which includes in-band communication 254 and out-of-band communication 256. The DSCT 110 includes a tuner 602, a transceiver 604, a demultiplexer 606, a processor 608, a cryptographic device 610, a secure processor 612, a storage device 614, an input/output interface 616, a converter 618, and a memory 626.

Additionally, the DSCT 110 includes an input port 628 for receiving externally generated information, such as viewer inputs or commands from other devices. Subscriber inputs could, for example, be provided via a subscriber input device (not shown), such as buttons or keys located on the exterior of the DSCT 110 or a handheld remote control device that includes user actuated buttons.

The subscriber commands are received by the input port 628, which sends the commands to the processor 608. The processor 608 and memory 626 include the logic necessary for implementing commands from the subscriber input device (not shown).

A subscriber uses the remote control select a "channel" that is associated with an instance of service or program provided by an entitlement agent. The processor 608 uses tables such as network information tables (NITs) stored in memory 626 to determine the frequency band associated with the user selected "channel." The processor 608 then instructs the tuner 602 to tune to that particular frequency band. The instructions are relayed from the processor 608 to the tuner 602 via bus 620.

The tuner 602 provides the demultiplexer 606 with the transport stream 242 that is contained in the frequency band to which the tuner is tuned. The demultiplexer 606 extracts system tables such as NITs, PATs and CATs, which are included in packets having reserved PID values and provides the tables to the processor 608 via bus 620. Typically, the system tables are periodically included in a transport stream, and when a new system table is extracted by the demultiplexer 606, the new table is sent to the processor 608. Typically, some of the system tables are stored in memory 626, so that the processor 608 can have prompt access to them.

In addition to extracting system tables and specific packets determined by the processor 608, the demultiplexer 606 extracts ECM packets, which are then provided to the secure processor 612, via bus 620, for processing. In one embodiment the EMMs are transmitted to the DSCT 110 in the in-band communication path 254, and the demultiplexer 606 extracts the EMMs and provides them to the secure processor 612.

Typically, a transport stream in a frequency band includes multiple multiplexed programs or instances of service, and each program or instance of service corresponds to a user "channel." Thus, in response to a user selecting a new "channel," the processor 608 uses tables such as PATs and PMTs to determine the PID values of the elementary streams that make up the instance of service or program associated with the selected user "channel." It should be remembered that the new "channel" is part of a transport stream and that the new channel may be included in the frequency band of the old channel. It is to be understood user channel represents one type of communication channel. Communication channels include, but are not limited to, communication signals that are separated by: frequency, which is generally referred to as frequency-division multiplexing (FDM); time, which is generally referred to as time-division multiplexing (TDM); and code, which is generally referred to as code-division multiplexing (CDM). In the preferred embodiment, a frequency band having a transport stream included therein is 6 MHz wide, and the in-band communication path 254 includes multiple 6 MHz bands. Historically, one analog television signal was broadcast in a 6 MHz band, and consequently, each band was considered a television channel. This historical approach is no longer accurate because with the advent of multiplexing each of the 6 MHz bandwidths can contain multiple communication signals. Thus, it is to be understood that a channel does not specify a frequency band, rather it refers to a communication signal.

The processor 608 sends the PID values of the elementary streams to the demultiplexer 606 via bus 620, and the demultiplexer 606 extracts the packets having the PID values identified by the processor 608. The demultiplexer 606 processes the elementary streams according to instructions received from the processor 608 and sends the packets of the elementary streams to either cryptographic device 610, which is a cryptographic device that encrypts and decrypts information, for further processing or to a storage device. After the cryptographic device 610 has processed the packets, the packets are then sent to either storage device 614 or to the input/output interface 616 for storage in an external storage device 650 or to another external device (not shown). Non-limiting examples of storage devices include, but are not limited to, hard-drives, CDs, magnetic tape, DVDs, and media servers.

The transceiver 604 is used by processor 608 for two-way communication via the out-of-band communication path 256 with the headend 102 or HUB 104. Frequently, the communications from the processor 608 to the headend 102 or HUB 104 include requests for services such as receiving a video-on-demand program or instance of service. In addition, the communications from the headend 102 or hub 104 can include commands. For example, the processor 608 can receive from the headend 102 instructions for storing a program or instance of service. The commands include instructions for tuning to a particular frequency band at a predetermined time, extracting a specific program or instance of service included in the transport stream that is modulated at the particular frequency band and processing the program or instance of service of that transport stream. If the DSCT 110 is inactive, i.e., not being used by the subscriber, the processor 608 responds to those instructions by having the tuner 602 tune to the appropriate frequency at the predetermined time. The processor 608 has the demultiplexer 606 extract from the transport stream 242 the elementary streams for the specific program or instance of service. The demultiplexer 606 processes the elementary streams according to instructions relayed from the processor 606 and sends the packets of the elementary streams to either cryptographic device 610 for further processing or to a storage device.

The processor 608 sends the cryptographic device 610 instructions regarding how the cryptographic device 610 should process elementary stream provided by the demultiplexer 606 and where the cryptographic device 610 should send the processed elementary streams. In the preferred embodiment, the cryptographic device 610 is adapted to perform multiple functions of a cryptographic algorithm on the payload portion 404 of the packets 400 (FIG. 4) that make up the received elementary streams, and it is adapted to perform more than one type of cryptographic algorithm.

Typically, when the cryptographic device 610 receives packets 400 (FIG. 4) which are encrypted, from the demultiplexer, the cryptographic device 610 obtains the control word 524 from the secure element 612 and decrypts the packets. The packets 400 are then sent to the converter 618 so that they can be converted to the appropriate format for a user device such as, but not limited to, a TV 112, VCR, or computer.

Sometimes the processor 608 tells the cryptographic device 610 that the packets 400 are to be sent to a storage device such as storage device 614, or storage device 650 via the input/output interface 616. In that case, the cryptographic device 610 can process the packets in at least several different ways. In one non-limiting case, it can get instructions from the processor 608 to decrypt the packets using the control word 524 and then re-encrypt the payload 404 of the packets 400 using an encryption key, or media key. The media key, which is used as a key for encrypting and decrypting content stored at the subscriber's location, can be generated by the processor 608, the secure element 612, or the system controller 232. The re-encrypted packets are then sent to the storage device 614, or to the input/output interface 616 along with the media key, which is associated with the packets. The media key can be used to encrypt all of the packets that make up a program or instance of service, or multiple media keys can be used to encrypt different packets of the program or instance of service. In one embodiment, the packets that make up a program or instance of service are encrypted by multiple media keys including the control word 524.

In another non-limiting case, the cryptographic device 610 receives packets having encrypted content and gets instructions from the processor 608 to further encrypt the payload 404. In that case, the cryptographic device 610 gets a media key and uses it to convert the ciphertext of the payload 404 to a different ciphertext 404. The cryptographic device 610 then sends the processed packets along with the media key to the storage device 614, or to the input/output interface 616. The media key is then associated with the packets and sent along with the packets for storage. Again, a single media key can be used to encrypt all or some of the packets that make up a program or instance of service.

In another non-limiting case, the encrypted packets received from the demultiplexer 606 can be processed by the cryptographic device 610 multiple times using multiple keys and multiple functions of a cryptographic algorithm according to instructions from the processor 608. The cryptographic device 610 then sends the processed packets and at least one of the multiple keys for storage to the storage device 614 or to the input/output interface 616.

In yet another non-limiting case, the cryptographic device 610 receives packets from the demultiplexer 606 that are not encrypted, i.e., clear text packets, the cryptographic device 610 receives a media key and uses the media key with a function of a cryptographic algorithm to encrypt the packets. Again, the media key can be generated at the headend, or by the processor 608, or by the secure element 612. The encrypted packets and the media key are sent to either the storage device 614 or to the input/output interface 616 for storage.

Thus, in the preferred embodiment, the cryptographic device 610 can do at least one or more of the following: (1) receive cleartext packets, encrypt them, and send them to a storage device; (2) receive encrypted packets, decrypt them, and send them to a storage device, or to the converter 618, or re-encrypt them and then send them to a storage device;

and (3) receive encrypted packets, further encrypt them, and send them to a storage device.

Downloadable programs and services can also be received via out-of-band communication path 256. The packets of the downloaded program or instance of service can be sent from the transceiver 604 directly to a storage device such as storage device 614 or 650, and/or they can be sent to the cryptographic device 610 for processing prior to storage.

The subscriber can use his or her DSCT 110 user interface such as a remote control to retrieve stored programs or instances of service. The processor 608 responds to user commands and checks whether the stored program or instance of service is encrypted. If it is not encrypted the user is provided with the program or instance of service via the converter 618.

If the stored program or instance of service is encrypted, the processor 608 provides the cryptographic device 610 with the media key, or media keys, and the corresponding packets of the program or instances of service. The cryptographic device 610 decrypts the program or instance of service and sends the decrypted program or instance of service to the user device via converter 618. In the preferred embodiment, the processor 608 first determines whether the user has permission to access the program or instance of service before the program or instance of service is provided to the cryptographic device 610; and if the subscriber does not have permission, the media key and the program and the instance of service are not provided to the cryptographic device 610. A method, among others, for restricting access to stored content is described in detail hereinbelow.

The secure processor 612 includes a processor 622 and a memory 624. In the preferred embodiment, the secure processor 612 is in tamper proof packaging to prevent unauthorized persons from accessing processor 622 and memory 624. The memory 624 is accessible only to the processor 622. The secure processor 612 includes the logic for processing EMMs and ECMs and for providing control words 524 to the cryptographic device 610 via bus 620 for decrypting received encrypted programs or instances of service.

The logic of the secure processor 612 also enables the processor 622 to configure and allocate a portion of the memory 624 to a TED 302 to establish the TED 302 with the DSCT. The processor 622 configures and allocates the memory 624 in response to EMMs from the CAA 312. The memory 624 includes the private key of the DSCT 110 and the public key of each TED 302 that is established with a DSCT 110. The private key of the DSCT 110 is kept within the secure element 612 and is not accessible to components outside of the secure element 612. The secure element 612 also includes the logic necessary for generating encryption keys that are used for encrypting programs or instances of services or other content that is stored in the storage device 614 or storage device 650.

In order to access a program or instance of service associated with a particular TED 302, the DSCT 110 needs the MSK 522 provided by the TED 302 and the control word 524 that was used for encrypting packets of the program or instance of service. The DSCT 110 is provided with the MSK 522 and an EMM from the TED 302 and with indicators used for producing the control word 524 in the ECMs. As described hereinbelow, the secure element 612 processes the EMMs and ECMs to generate the control word 524 and determine whether the DSCT 110 is entitled to the program or instance of service.

Figure 7:
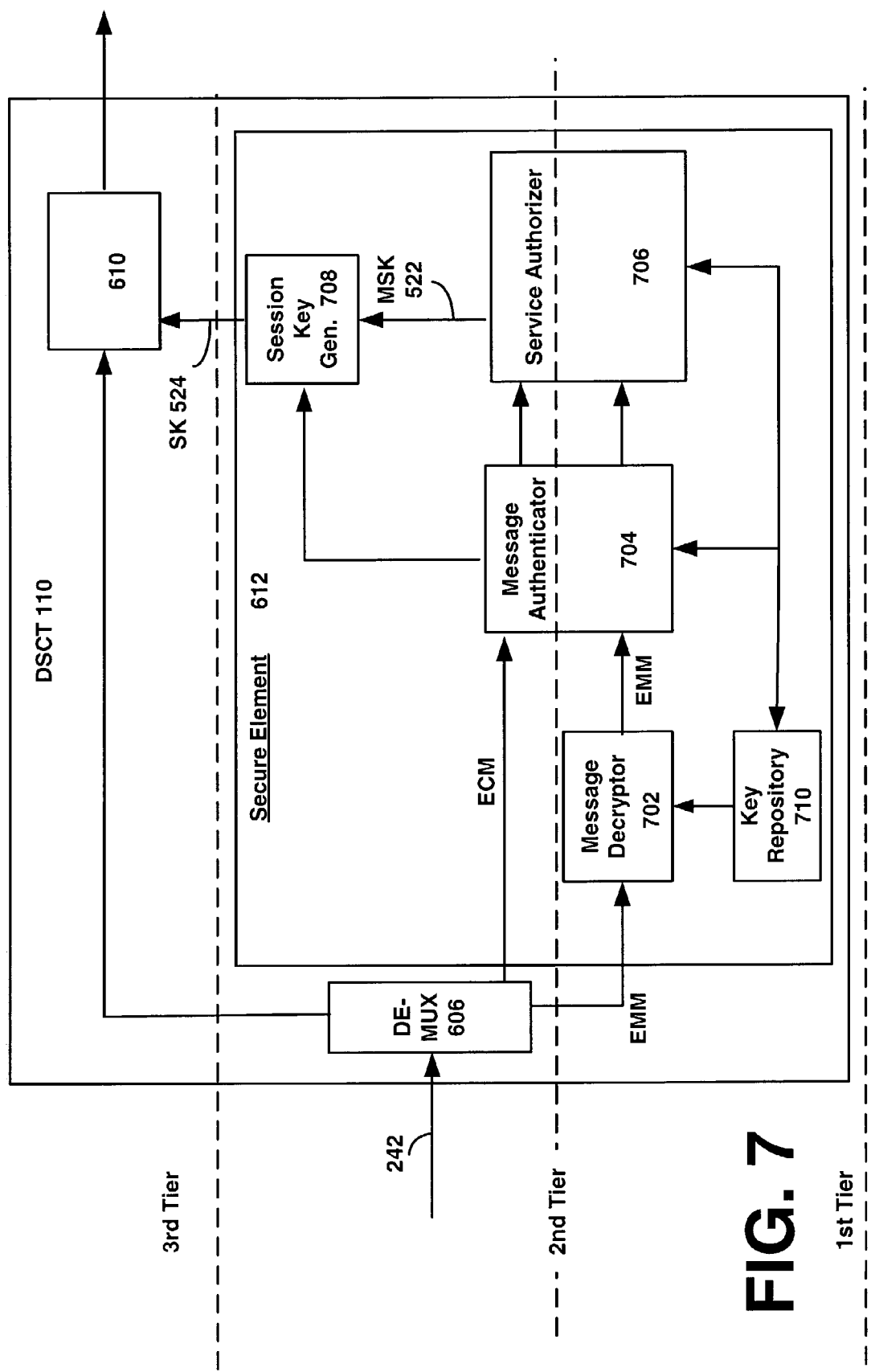
FIG. 7 illustrates the levels of security in the broadband communication system at the DSCT.

Referring to FIG. 7, which shows in the preferred embodiment, selected elements of the DSCT 110, among many other elements, the secure element 612 includes a message decryptor 702, a message authenticator 704, a service authorizer 706, a control word generator 708, and a key repository 710, which are embodied in the logic of the processor 622 and the memory 624.

The demultiplexer 606 receives transport stream 242 and sends the EMMs and ECMs that are included in transport stream 242 to the secure processor 612 for processing. The demultiplexer 606 also sends the encrypted elementary streams of selected programs or instances of service to the cryptographic device 610 for decryption.

The EMM having the MSK 522 that was used in the generation and/or protection of the control word 524 is received at the DSCT 110 prior to receiving the content that was encrypted using the control word 524.

The key repository 710 has the public key-private key pair of keys for the DSCT 110 stored therein and the public keys that the DSCT 110 has received. Received public keys include the public keys of established TEDs 302. The key repository 710 is also used for storing MSKs 522.

The message decryptor 702 receives an EMM and retrieves the private key of the DSCT 110 from the key repository 710 and uses the private key to decrypt the content of the EMM. The cleartext or decrypted message content and the authentication token of the EMM are provided to the message authenticator 704. The message authenticator 704 validates the authentication token of the EMM. To validate the authentication token of the EMM, the message authenticator 704 checks to see if the purported sender of the EMM did actually send the message and then checks the content of the message. First, the message authenticator 704 obtains from the key repository 710 the public key that is associated with the TED 302 that purportedly sent the EMM and uses the public key to process the digital signature applied to the authentication token to recover a value. If the public key corresponds to the private key that applied the digital signature to the authentication token, then the recovered value represents the hash digest of the message. Otherwise some other value is recovered. Next, the message authenticator creates a hash digest of at least a portion of the decrypted content of the EMM. The hash digest is compared with the recovered value, and if they are the same, the EMM is valid. If the contents of the EMM had been altered by the subscriber or other unauthorized persons or corrupted in transmission, the hash digest and recovered value would not be the same. In that case, the EMM would be ignored in this embodiment. The verification also fails if the public key used to recover the value was not the corresponding key because hash digest of the message content will not match the recovered value.

As previously described hereinabove, the contents of the EMM are generally service authorizations or keys. When the content of the EMM includes service authorizations, i.e., authorizations for instances of service and programs provided by the entitlement agent associated with the TED 302 to the DSCT 110, the service authorizations are provided to the service authorizer 706. When the EMM content is a key, such as an MSK 522, the key is stored in the key repository 710. However, it should be noted that the contents of the EMM are preferably only acted upon provided: (1) the EMM was addressed to the DSCT 110; (2) the EMM was actually signed by the TED that purportedly sent the EMM; and (3) the contents of the EMM have not been altered or corrupted. Of course, other embodiments may not require all of these security features. In the preferred embodiment of the invention, the EMMs are processed in the first tier of security.

Before the program or instance of service can be decrypted by the cryptographic device 610, the ECM, which is in the second tier of security, must be received and processed by the secure processor 612. In the preferred embodiment, the ECM includes the cleartext counter value that is used to generate the control word 524 and an authentication token. The message authenticator 704 retrieves the MSK 522 from the key repository 710 and creates a hash digest of at least a portion of the MSK 522 and at least a portion of the content of the ECM. The hash digest is compared to the authentication token, and if they are the same, the ECM is regarded as valid. In that case, the counter value is sent to the control word generator 708.

The service authorizer 706 includes the authorizations for services provided to the DSCT 110 by the entitlement agent. The service authorizer 706 checks the ECM and determines whether the DSCT 110 is authorized for a particular program or instance of service provided by the entitlement agent. When the DSCT 110 is authorized, the service authorizer 706 provides the control word generator 708 with the MSK 522.

The control word generator 708 receives the control word, which is a number, from the message authenticator 704 and encrypts the control word using the MSK 522 to produce the control word 524. The control word generator 708 provides the control word 524 to the cryptographic device 610, and finally, the cryptographic device 610 uses the control word 524 to decrypt the elementary streams of the selected program or instance of service.

In another embodiment, the ECM includes the cleartext counter value and an authentication token, which is the digest of a one-way hash function having as inputs at least a portion of the control word 524, the message content of the ECM and the MSK 522. In this case, the message authenticator 704 retrieves the MSK 522 from the key repository 710 and provides the MSK 522 and the cleartext counter value to the control word generator 708. The control word generator 708 generates the control word 524 and returns it to the message authenticator 704, which uses it, the MSK 524 and the content of the ECM to generate a hash digest. The hash digest generated by the message authenticator 704 is compared with the authentication token included with the ECM and if they are the same, the message authenticator 704 validates the message as being authentic. In response to the message authenticator 704 validating the ECM, the service authorizer 706 receives the control word 524 from the message authenticator 704 and provides the control word 524 to the cryptographic device 610.

In yet another embodiment, the ECM includes an encrypted control word 524 that was encrypted by a cryptographic algorithm using the MSK 522 as a key. In that case, the message decryptor 702 retrieves the MSK 522 from the key repository 710 and uses the MSK 522 to decrypt the contents of the ECM. The control word 524 is then provided to the service authorizer 706, which will provide the cryptographic device 610 with the control word 524 only if the DSCT 110 is authorized for the program or instance of service associated with the control word 524. The encrypted elementary streams of the programs of instances of service are in the third tier of security.

The multi-tiered encryption scheme offers a number of advantages with regard to security. It takes advantage of the speed of symmetrical encryption system where speed is useful to encrypt and decrypt the payload 404 of packets 400 and to produce the control word 524. The control word 524 is protected in the ECM by encrypting it using the MSK 522 and by including an authentication token in the ECM. The authentication token includes a portion or all of the MSK 522 as a shared secret between the TED 302 and the DSCT 110. The MSK 522 is protected in turn by the fact that it is sent in an EMM that is encrypted using the DSCT's public key and by the fact that the EMM includes a sealed digest that is signed by the entitlement agents private key. Further, security is provided by the fact that service identification information from the ECM must agree with authorization information received in an EMM before the control word 522 is provided to the service decryptor 610.

Accessing Stored Programs or Instances of Service

In the preferred embodiment, when a program or instance of service is stored at the subscriber location 108, the program or instance of service is encrypted by the cryptographic device 610 using a media key, and the media key is stored with the program at the subscriber location. However, in an alternative embodiment the media key is stored at the headend 102 in the TED 302 or in the CAA/TED database 322 or with the entitlement agent. In that case, the subscriber must obtain the media key to access the stored content. Having the headend 102 or the entitlement agent act as a key repository helps protect the property rights of the content owner. If a subscriber makes an illegal or unauthorized copy of the stored encrypted program or instance of service, the program or instance of service cannot be accessed without the knowledge and consent of the entity acting as the key repository.

In the preferred embodiment, the media key is stored at the subscriber location 108, and thus the media key needs to be protected. If the media key is easily accessible or unprotected, the media key and the encrypted program or instance of service can be duplicated without the consent of the content owners. In an alternative embodiment, the program or instance of service is encrypted by a plurality of media keys. The plurality of media keys can be used to encrypt and then further encrypt the program or instance of service. In yet another embodiment, the media key includes a plurality of media keys, and each media key is used to encrypt some of the packets of the program or instance of service. In an alternative embodiment, the program or instance of service is processed by the cryptographic device 610 using a plurality of keys, and at least one of the keys is used as a media key to further encrypt the program or instance of service.

The processor 608 and memory 626 include the logic necessary for associating a media key, or keys, with the stored program or instance of service. In the preferred embodiment, access to the stored program or instance of service is controlled by encrypting the media key using the public key of the DSCT 110, and then restricting access to the media key. The media key is associated with the program or instance of service via the program header. The media key is associated with the program or instance of service using a program header, which is discussed in greater detail hereinbelow. The memory 626 and the processor 608 include the logic necessary for creating and processing the program header.

Figure 8:
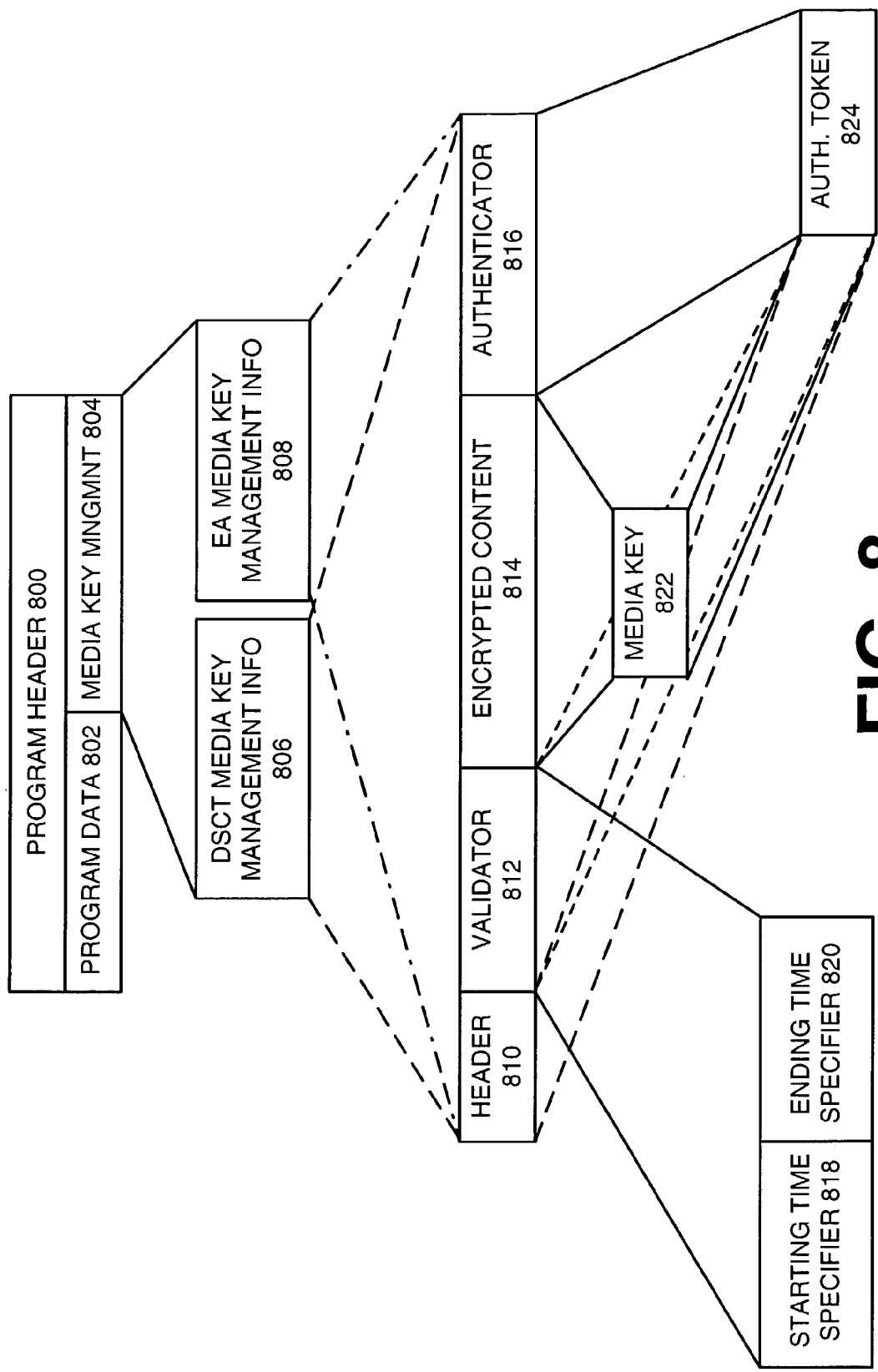
FIG. 8 is a block diagram of a program header.

Referring to FIG. 8, the program header 800 includes program data 802 and Media Key Management Information 804. The program data 802 includes information related to the stored program or instance of service. For example, program data 802 can include such things such as, but not limited to, the name of the program, the length of the program, the date the program was released, etc.

The Media Key Management Information 804 includes a DSCT Media Key Management Information 806 and an Entitlement Agent Media Key Management Information 808. The DSCT Media Key Management Information 806 provides the DSCT 110 with the necessary information for determining whether the DSCT 110 can access the stored program or instance of service. The Entitlement Agent Media Key Management Information 808 includes information for obtaining a valid media key from the entitlement agent associated with the stored program or instance of service. As will be explained in detail hereinbelow, the media key can become invalid, and in that case, the DSCT 110 can obtain a revalidated media key.

In the preferred embodiment, the DSCT Media Key Management Information 806 and the Entitlement Agent Media Key Management Information 808 include the same types of information: header 810, validator 812, encrypted content 814, and authenticator 816.

The header 810 of the DSCT Media Key Management Information 806 includes information used by the DSCT 110 and the header 810 of Entitlement Agent Media Key Management Information 808 includes information used by the DSCT 110 and by the TED 302. The information includes such things as identifiers associated with public key-private key pairs of the DSCT 110 such as the serial number of the DSCT 110 and/or information about the TED 302. The identifiers are stored in a table in the memory 626.

The validator 812 includes information for determining whether the media key 822 is valid. For example, the subscriber may have "rented" the program or instance of service that is associated with the program header 800 for a specified time, in that case the validator 812 indicates an expiration date, i.e., a date when the media key 822 is no longer valid. Without a valid media key, the DSCT 110 cannot decrypt the stored program or instance of service.

In the preferred embodiment, the validator 812 includes a starting time specifier 818 and an ending time specifier 820, which denote the time span over which the media key 822 is valid. In an alternative embodiment, the validator 812 includes the starting time specifier 818 and a range specifier, and the expiration date of the media key 822 is determined from the sum of the starting time specifier and the range specifier. Alternatively, the expiration date can be specified, and the starting time can be determined by subtracting the range specifier from the expiration date. In yet another embodiment, the validator 812 includes just the expiration time without a starting time. However, it is generally desirable that the media key 822 be valid over a defined interval of time. By having a defined internal over which the media key 822 is valid, the operator of the DBDS 100 can pre-load the program or instance of service in the DSCT 110 and prevent the subscriber from accessing the program or instance of service until a predetermined specified time. Thus, a block buster pay-per-view program can be pre-loaded, when there is available bandwidth in the DBDS 100, in the DSCT 110 and stored locally without the subscriber being able to access the program until its official release date.

In yet another embodiment, the validator 812 indicates that the subscriber has purchased the program or instance of service instead of renting it. Non-limiting examples of a purchase indicator include setting a flag in the validator 812, setting the expiration date to zero, or setting the expiration date to a time that is before the starting time, or setting the validator 812 to null or some other predetermined value. In the preferred embodiment, the validator 812 is cleartext so that the processor 608 can easily determine if the media key 822 is valid.

When a subscriber tries to access a stored program or instance of service, through a user interface (not shown), the processor 608 reads the validator 812 of an associated program header 800. In one implementation, if the subscriber has "purchased" the program or instance of service, the validator 812 indicates that the media key 822 is valid. On the other hand, if the subscriber has "rented" the program or instance of service, the processor 608 checks to see if the media key 822 has expired. The processor 608 includes the logic necessary for functioning as a clock. Thus, the processor 608 compares the current time, as determined by its clock, with the starting time specifier 818 and ending time specifier 820 and when the current time is within those limits the processor 608 determines that the media key 822 is still valid. In other embodiments, the lack of an expiration date indicates the user has purchased the program or instance of service, i.e., the media key 822 never expires and the user always has access to the program or instance of service.

The authenticator 816 includes an authentication token 824. The authentication token 824 is a HASH digest produced by the processor 608 using the header 810, the validator 812, and the media key 822 or portions thereof as inputs. The authentication token 824 is signed by the secure element 612 using the private key of the DSCT 110.

The encrypted content 814 is encrypted by processor 608 using a public key of the DSCT 110. The processor 608 uses the public key of the DSCT 110 to encrypt the encrypted content 814 of the DSCT Media Key Management Information 806 and the public key of the TED 302 to encrypt the encrypted content 814 of the Entitlement Agent Media Key Management Information 808. Because each DSCT keeps its private key secure and private in its secure processor 612, only the DSCT 110 that encrypted the encrypted content 814 of the DSCT Media Key Management Information 806 can decrypt it. Similarly, only the TED 302 can decrypt the encrypted content 814 of the Entitlement Agent Media Key Management Information 808.

The encrypted content 814 includes the media key 822, which is used for decrypting the encrypted program or instance of service, and it can also include another copy of the validator 812. Whether the validator 812 is included in the encrypted content 814 or as cleartext or as both as a matter of implementation. An advantage of having the validator 812 included in the encrypted content 814 is that it prevents an unauthorized user from changing the validator 812. Whereas, an advantage of having the validator 812 as cleartext is that it makes it easy for the processor 608 to determine whether the media key 822 is still valid.

In the preferred embodiment, the Entitlement Agent Media Key Management Information 808 is used for revalidating an expired media key. Thus, if the subscriber "rented" a program or instance of service and the rental period has expired, the subscriber can have the media key 822 revalidated. The Entitlement Agent Media Key Management Information 808 is transmitted to the TED 302 that is associated with the stored encrypted content. The TED 302 uses its private key to decrypt the encrypted media key 822. It also uses the public key of the DSCT 110 to verify which DSCT 110 sent the Entitlement Agent Media Key Management Information 808 by checking the signature applied to the authentication token 824. In response to request for revalidation, the TED 302 includes a new validator 812 and the media key 822 in an EMM and sends the EMM to the DSCT 110.

Figure 9:
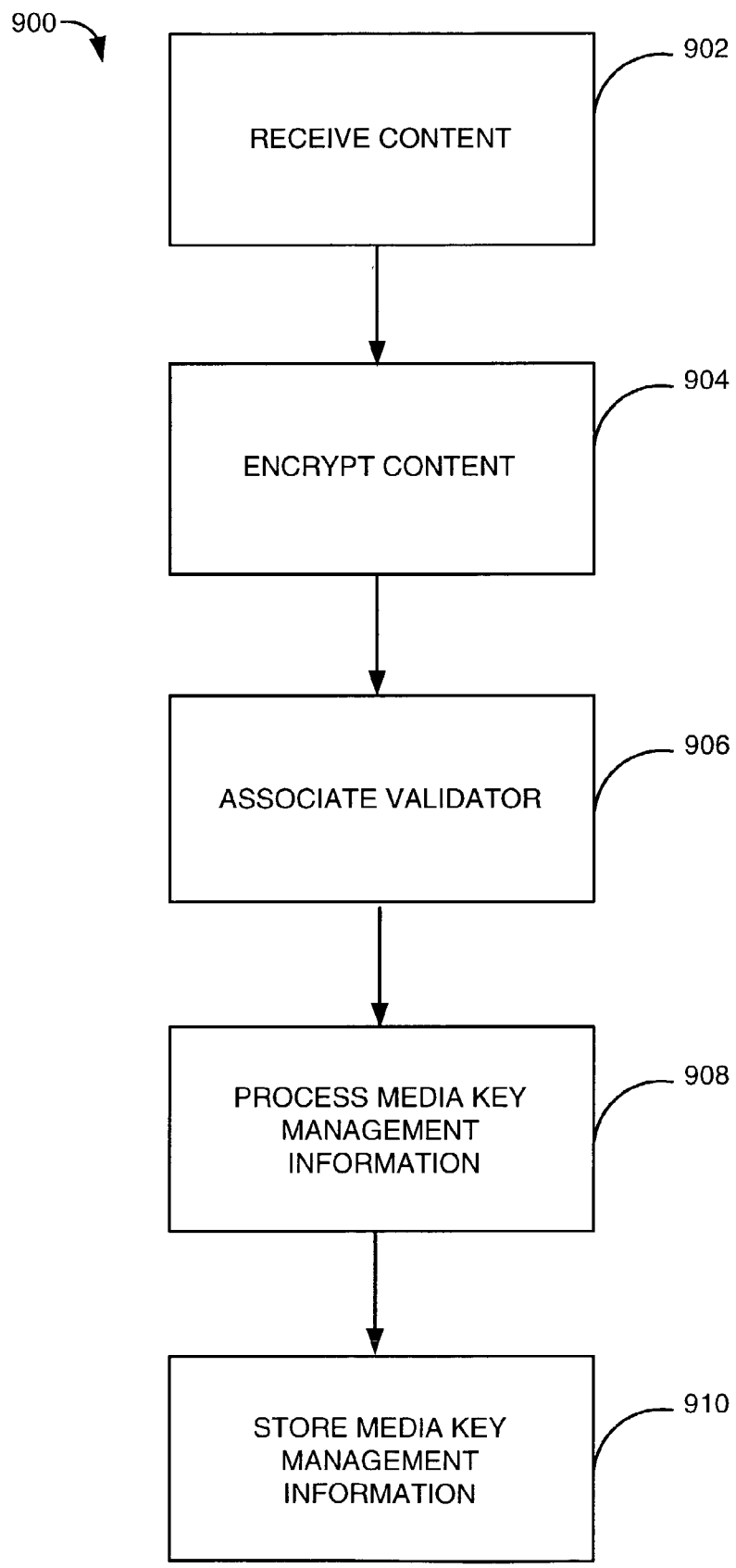
FIG. 9 is a flow chart for storing programs at the DSCT.

Referring now to FIG. 9, steps 900 are implemented in the DSCT 110 by an application executing on processor 608 for storing programs or instances of services, which can be stored locally in storage device 614 or in external devices coupled to the DSCT 110. However, it is to be understood that any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

In step 902, the content is received at the DSCT 110. Generally, the content is ciphertext that has been encrypted using a control word 524. In the preferred embodiment, the content is decrypted by cryptographic device 610 using the control word 524, which is provided to the cryptographic device 610 by the secure processor 612. However, it should be remembered that content received at the DSCT for local storage, either internal or external to the DSCT 110, can be cleartext or ciphertext, and that ciphertext need not be decrypted prior to storage.

In the preferred embodiment, multiple packets of the program or instance of service are encrypted at the headend 102 using different control words 524, and the control words 524 or the control word used for generating the control words are provided to the DSCT 100 in ECMs. In that case, in the preferred embodiment, the secure processor 612 provides the cryptographic device 610 with the control words 524 so that the ciphertext can be converted into cleartext before storing it.

In step 904, the content of the packets are is encrypted by the cryptographic device 610 using the media key, or media keys, 822 and the encrypted content is stored in the storage device 614, or in an external storage device coupled to the DSCT 110. It is to be understood that the content, which was encrypted in step 904, can be cleartext content that was received as cleartext, or cleartext content that was received as ciphertext and converted to cleartext, etc.

However, the content received at the DSCT 110 can also be ciphertext, which is not converted to cleartext prior to storage. Rather, in step 904, the ciphertext is encrypted by cryptographic device 610 using a media key 822 and then stored locally. Again, local storage refers to storage device 614 or in an external device coupled to DSCT 110. The headend 102 provides the DSCT 110 with the necessary control words 524 for decrypting the received ciphertext, but the program or instance of service is not decrypted prior to storage. Instead, the control words 524 and media key 822 are associated with the received ciphertext and used to decrypt the ciphertext when the subscriber wishes to access the storage program or instance of service.

In the preferred embodiment, the processor 608 generates the media key 822 used for encrypting the received content, and it provides the media key 822 to the cryptographic device 610. The cryptographic device 610 employs a cryptographic algorithm such as DES, 3DES, DVB common scrambling, or other symmetrical cryptographic algorithms known to those skilled in the art to encrypt the content based on instructions from the processor 608. In an alternative embodiment, the media key 822 is provided to the DSCT 110 in a message, such as an EMM or ECM, from the headend 102. Usually, a single media key 822 is used in encrypting all of the packets of a program or instance of service. However, in alternative embodiments, different media keys are used for encrypting different portions of the program or instance of service.

In step 906, the media key 822 is associated with the validator 812. Generally, the subscriber interacts with the DSCT 110 and determines whether he wants to "buy" or "rent" the encrypted program or instance of service and this selection is indicated in the validator 812. The processor 608 and the memory 626 includes the necessary logic for responding to user commands received through the user interface device. Sometimes, the validator 612 is associated with the media key 822 without subscriber interaction. For example, the program or instance of service could be downloaded to the DSCT 110 without the knowledge of the subscriber, and at that point in time the validator 812 would indicate that the media key 822 is expired. This prevents the subscriber from accessing the downloaded program or instance of service without the consent of the entitlement agent. The subscriber is then informed about the downloaded program and asked if he or she wants to access it. If he or she does, a request is sent to the TED 302 and a new validator 812, which is valid, and/or media key 822 is sent to the DSCT 110 of the subscriber, and the subscriber is billed for the program or instance of service.

In step 908, the media key 822 and validator 812 are processed to make the DSCT Media Key Management Information 806 and Entitlement Agent Media Key Management Information 808. As previously described hereinabove, at least a portion of the media key 822 and the validator 812 are used as inputs for the HASH function and output therefrom is used as the authentication token 824. The media key 822, the validator 812 and the authentication token 824 are duplicated and included in the DSCT Media Key Management Information 806 and Entitlement Agent Media Key Management Information 808. As previously described hereinabove: the media key 822 is encrypted with the public key of the DSCT 110 when it is included in the DSCT Media Key Management Information 806; and the media key 822 is encrypted with the public key of the TED 302 when it is included in the Entitlement Agent Media Key Management Information 808. The authentication token 824 is digitally signed in the secure processor 612 by the private key of the DSCT 110 and included in the DSCT Media Key Management Information 806 and in the Entitlement Agent Media Key Management Information 808.

In step 910, the DSCT Media Key Management Information 806 and Entitlement Agent Media Key Management Information 808 are included in the program header 800 and the program header 800 is stored with the program or instance of service. However, in an alternative embodiment, the TED 302 is a key repository for storing media key 822. The media key 822 is encrypted with the public key of the DSCT 110 and sent to the TED 302. When the subscriber wants to access the stored content, the TED 302 sends the media key 822 back to the DSCT 110 in a message such as an EMM where it is decrypted with the private key of the DSCT 110. In such an embodiment, the TED 302 can determine the validity of the media key 822 and determine whether the key has expired.

Figure 10:
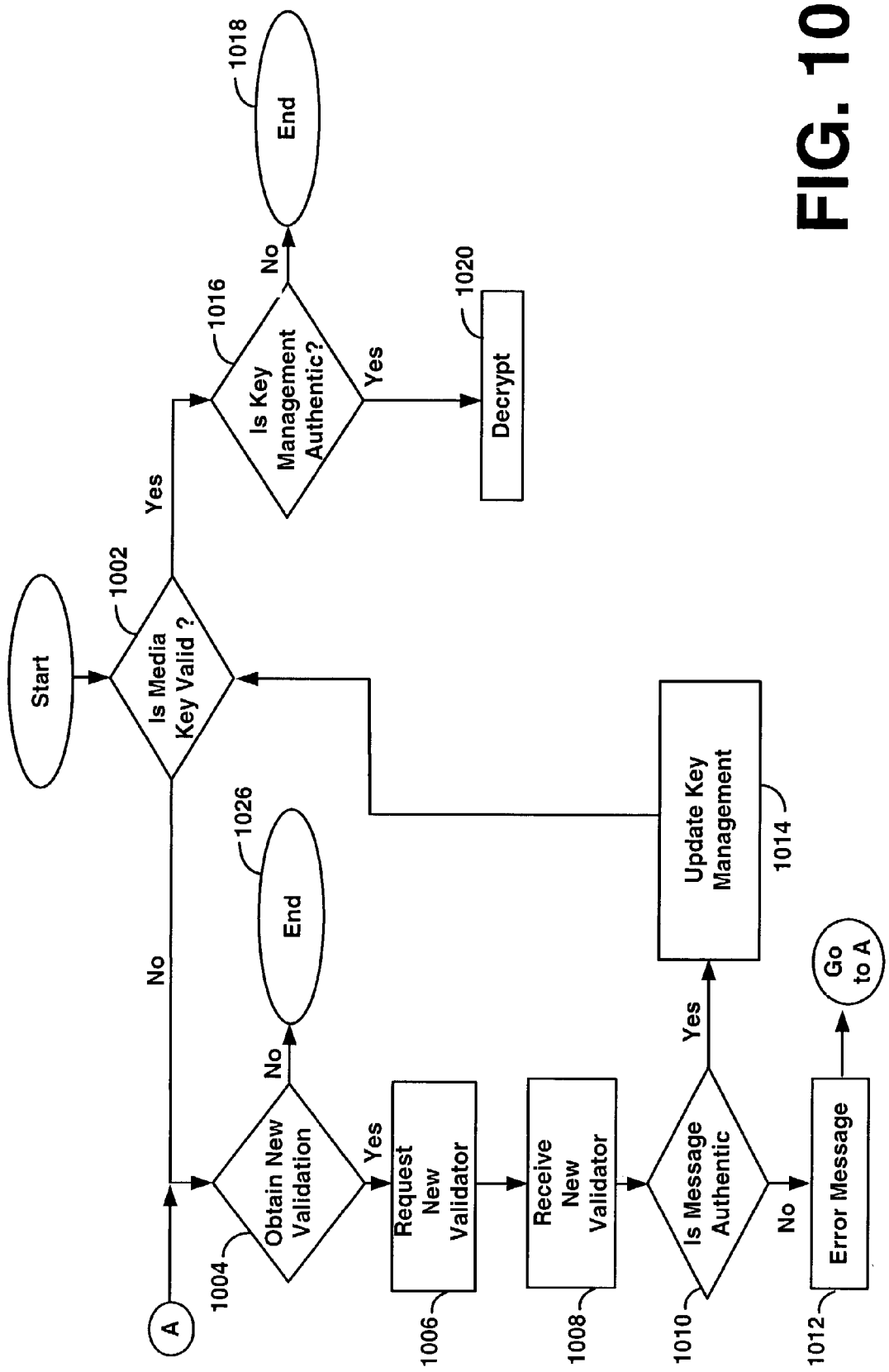
FIG. 10 is a flow chart for accessing stored encrypted content.

Refer now to FIG. 10, steps 1000 are implemented in the DSCT 10 when the subscriber wants to access the encrypted content. The subscriber uses his or her user interface device (not shown) to select a stored program or instance of service. The processor 608 responds to the user commands by retrieving the program header 800 that is associated with the selected program or instance of service.

In step 1002, the processor 608 determines whether the media key 822 is valid. In the preferred embodiment, the validator 812 is cleartext included with the DSCT Media Key Management Information 806, and in that case the processor 608 simply reads the validator 812 to determine the validity of the media key 822. In an alternative embodiment, the processor 608 sends the DSCT Media Key Management Information 806 to the secure processor 612 to determine its validity because the validator 812 is encrypted. In that case, the secure processor 612 decrypts the encrypted content 814 using the private key of the DSCT 110; reads the validator 812; and reports the validity of the media key 822 to the processor 608.

If the media key 822 is not valid, the processor 608 proceeds to step 1004, where the subscriber is informed that the rental period for the encrypted program or instance of service has expired. The subscriber is presented with information and choices related to getting a new rental period or purchasing the program or instance of service. Generally, the information provided to the subscriber includes such things as the cost and duration of the rental and/or the "purchase" price. If the subscriber decides to obtain another rental period, or purchase the program or instance of service. The subscriber uses the subscriber interface device (not shown) to make his or her selection, and the processor 608 proceeds to step 1006; otherwise the process ends at step 1026.

In step 1006, the processor 608 sends a request for revalidation of the rental, or a purchase request, to the TED 302. In the preferred embodiment, the request includes the Entitlement Agent Media Key Management Information 808, which the TED 302 processes.

In step 1008, the processor 608 receives a new validator 812 from the TED 302. The new validator 812 includes an expiration date for the rental or purchase. In the preferred embodiment, the new validator 812 is included in an EMM message, which is authenticated in step 1010. If the message is not authentic the subscriber is given an error message in step 1012, and the process starts again at step 1004.

At step 1014, the processor 608 and the secure processor 612 implement the steps necessary for updating media key management. A new DSCT Media Key Management Information 806 and a new Entitlement Agent Media Key Management Information 808 are produced, and each includes an updated validator 812 and authenticator 816. The new DSCT Media Key Management Information 806 and Entitlement Agent Media Key Management Information 808 are associated with the program header 800. After updating the media key management 804, the processor 608 returns to step 1002.

Referring back to step 1002, if the media key 822 is valid, the processor 608 proceeds to step 1016 and checks its authenticity. In step 1016, the secure processor 612 decrypts the encrypted content 814 of the program header 800 and provides the cleartext of the encrypted content 814 to the processor 608. The processor 608 creates a HASH digest of at least a portion of the cleartext and the validator 812. Then the processor 608 checks the signature applied to the authenticator 816 using the public key of the DSCT 110. If the authenticator 816 was signed by the private key of the DSCT 110, then the processor 608 compares the authentication token 824 with the newly created HASH digest. If an unauthorized user has changed the validator 812, the HASH digest and the authentication token will not be the same; in that case, the process ends at step 1018. In addition, if the authenticator 816 was not signed by the private key of the DSCT 110, the process ends at step 1018. Checking the signature applied to the authentication token 824 prevents a subscriber from recording the program or instance of service through a first DSCT 110 and then accessing the program or instance of service through another DSCT 10. Thus, if the program or instance of service is stored in the external storage 650 it can only be accessed by the DSCT 110 that was used when storing it. This prevents subscribers from making bootleg copies of the program or instance of service.

In step 1020, the processor 608 sends the media key 822 to the cryptographic device 610 for decrypting the program or instance of service. It is important to note that the stored content is decrypted and provided to the user; it is not decrypted and stored as cleartext in a storage device. Each time the user wants to use the stored content, the user must validate and authenticate the media key 822.

In the preferred embodiment, the media key 822 is stored locally with the DSCT 110. This enables the subscriber to have access to the stored content as long as the media key 822 is valid. Because the media key 822 is stored locally, the subscriber can access the stored content even if communication between the headend 102 and DSCT 110 is broken. The subscriber can take the DSCT 110 with the encrypted content to a remote location, such as a mountain cabin or his or her neighbor's house, and still access the encrypted content. It is important to remember that the subscriber's DSCT 110 must be used to decrypt the media key 822 because it has the only copy of the private key that is used for decrypting the media key 822. So, if the subscriber copies the downloaded program or instance of service onto multiple external devices, the copies are worthless, because they don't include the decrypted media key 822. Only the DSCT 110 of the subscriber can decrypt the encrypted media key 822. Thus, the copies of the downloaded program or instance of service cannot be sold because they do not include the decrypted media key. The encryption of the media key 822 by the public key of the DSCT 110 and the signature applied to the authentication token by the private key provide two levels of security. Of course, embodiments include either of these levels, as well as other alternative types of security instead of and in addition to these levels.

It is important to remember that programs or instance of services extend beyond mere video and audio programs. In one embodiment, the DSCT 110 functions as a gateway between multiple subscriber devices and the headend. The DSCT 110 can limit or provide access to a program or instance of service. For example, an entitlement agent could license a computer program, which requires cleartext media key 822 to run to the subscriber. The DSCT 110 controls access to the media key and can enforce terms of the license by not providing the cleartext media key 822.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method of controlling access to an encrypted instance of service, which was encrypted by a first key, the method implemented in a receiver in a subscriber television system, the method comprising the steps of:
   (a) duplicating the first key;
   (b) encrypting the duplicate first key with a second key;
   (c) transmitting from the receiver the encrypted duplicate first key;

(d) encrypting the first key using a public key of a private key-public key pair belonging to the receiver, thereby converting the first key into an encrypted first key;

(e) associating a key validator with the encrypted first key, wherein the key validator includes a time indicator that indicates whether the encrypted first key is valid;

(f) determining whether the encrypted first key is valid;

(g) receiving at the receiver a second key validator that indicates the validity of the receiver to use the first key to decrypt the encrypted services;

(h) responsive to the encrypted first key being valid, decrypting the encrypted first key thereby recovering the first key; and (i) responsive to the second key validator indicating the encrypted first key is valid, decrypting the encrypted service instance using the recovered first key.

2. The method of claim 1, further including the steps of:
receiving the instance of service at the receiver;
encrypting the instance of service using the first key;
storing the encrypted instance of service; and
storing the encrypted first key.

3. The method of claim 2, wherein the instance of service received at the receiver includes ciphertext, further including the step of:
decrypting the ciphertext of the instance of service using the second key.

4. The method of claim 3, prior to decrypting the ciphertext of the instance of service, further including the steps of:
receiving a message and the service instance concurrently, wherein the message includes a second key token; and
generating the second key using the second key token.

5. The method of claim 1, wherein the time indicator includes a starting time and an ending time for which the first key is valid.

6. The method of claim 1, wherein the time indicator includes a time specifier and a range specifier, wherein the first key is valid for times between the time specifier and the time specifier plus the range specifier.

7. The method of claim 1, wherein the time indicator includes a time specifier and a range specifier, wherein the first key is valid for times between the time specifier minus the range specifier and the time specifier.

8. The method of claim 1, further including the steps of:
prior to step (f), (j) associating the encrypted first key with a key authenticator; and
after step (h), (k) authenticating the recovered first key using at least a portion of the recovered first key, wherein the recovered first key is used for decrypting the encrypted instance of service only when the recovered first key is authentic.

9. The method of claim 8, wherein the step (k) further includes the steps of:
making a HASH digest using at least a portion of the recovered first key as an input for a HASH function; and
comparing the HASH digest with the key authenticator and authenticating the key authenticator when it is the same as the HASH digest.

10. The method of claim 9, wherein the input for the HASH function includes at least a portion of the key validator.

11. The method of claim 9, wherein the key authenticator is a digitally signed HASH digest that is signed by the private key of the public key-private key pair associated with the receiver, and the step (k) further includes:
authenticating the signature of the receiver using the public key of the public key-private key pair.

12. The method of claim 1, further including the step of: generating at the receiver the first key.

13. The method of claim 1, wherein the private key is stored within a memory of a secure processor, wherein the memory is accessible only to the secure processor, and prior to step (h), further including the steps of:
responsive to the first key being valid, providing the encrypted first key to the secure processor; and
decrypting the encrypted first key using the private key of the public key-private key pair.

14. The method of claim 13, prior to step (h), further including the steps of:
associating the first key with a key authenticator, the key authenticator indicating the authenticity of the validator associated with the first key; and
authenticating the first key using at least a portion of the first key, wherein the first key is used for decrypting the encrypted instance of service only when the validator associated with the first key is authentic.

15. The method of claim 14, wherein the authenticating step further includes the steps of:
making a HASH digest using at least a portion of the first key as an input for HASH function; and
comparing the HASH digest with the key authenticator and authenticating the key authenticator when it is the same as the HASH digest.

16. The method of claim 15, wherein the input for the HASH function includes at least a portion of the key validator.

17. The method of claim 15, wherein the key authenticator is a digitally signed HASH digest that was signed by the private key of the public key-private key pair associated with the receiver, and the authenticating step further includes:
authenticating the signature of the receiver using the public key of the public key-private key pair.

18. The method of claim 1, wherein the key validator is encrypted using the public key of the private key-public key pair belonging to the receiver.

19. The method of claim 1, wherein the second key is a public key of a public key-private key pair, the private key securely stored at a headend of a subscriber television system.

20. A receiver in a digital subscriber network, the receiver receiving content provided by an entitlement agent through a first communication link, the receiver comprising:
a first key validator including a validation token having a time specifier for which a first key is validated;
a processor for duplicating the first key;
an encryptor adapted to encrypt the first key using a public key of a public key-private key pair associated with the receiver, and adapted to encrypt the duplicated first key with a second public key-private key pair, wherein the second public key is associated with the entitlement agent;
a second key validator that indicates the validity of the receiver to use the first key; and
based on the second key validator, a decryptor adapted to decrypt the first key using the private key of the public key-private key pair.

21. The receiver of claim 20, wherein the decryptor is included in a secure processor having a memory that includes the private key of the receiver, and the memory is accessible only to the secure processor.

22. The receiver of claim 20, further including:
a storage device having encrypted content stored therein, wherein the encrypted content was encrypted using the first key; and
a second decryptor adapted to decrypt the encrypted content using the decrypted first key.

23. The receiver of claim 20, further including:
an output port adapted to communication with an external storage device; and
a second decryptor adapted to decrypt the encrypted content using the decrypted first key.

24. The receiver of claim 20, further including:
an authenticator adapted to authenticate the first key, wherein the authenticator generates an authentication token associated with the first key.

25. The receiver of claim 20, wherein the authenticator further includes:
a digest maker adapted to making a HASH digest using at least a portion of the first key as an input to a HASH function; and
a comparator adapted to compare the HASH digest with the authentication token.

26. The receiver of claim 25, wherein the authenticator further includes:
a digital signer adapted to apply the private key of the public key-private key pair to the authentication token.

27. The receiver of claim 24, wherein the authenticator is included in a secure processor having a memory that includes a private key of the public key-private key pair and the memory is successful only to the secure processor.

28. The receiver of claim 20, wherein the first key validator further includes:
a clock adapted to measure time from a predetermined time; and
a comparator adapted to compare the measured time with the validation token, wherein the comparator uses the time specifier and the measured time to determine if the first key is valid.

29. The receiver of claim 20, further including:
a transceiver adapted to transmit a request for a validation token, wherein the validation token includes a time specifier indicating when the first key is valid.

30. In a receiver coupled to a subscriber television network, a method of controlling access to an encrypted instance of service provided to the receiver by a headend of the subscriber television network, the method comprising the steps of:
receiving at the receiver a service instance;
encrypting the service instance with a first key;
duplicating the first key with a second key;
transmitting from the receiver the encrypted duplicate first key;
generating a key validator having a time indicator included therein;
encrypting the first key with a public key of a private key-public key pair key, thereby converting the first key into an encrypted first key;
associating the encrypted first key with the key validator;
storing the encrypted service instance, the encrypted first key and the key validator in a storage device;
responsive to receiving a request for the stored encrypted service, retrieving the encrypted first key and the key validator from the storage device;
responsive to retrieving the encrypted key validator, determining whether the encrypted first key is valid using the key validator;
responsive to the encrypted first key being valid, receiving at the receiver a second key validator that indicates the validity of the receiver to use the first key;
responsive to the validity of the receiver to use the first key, decrypting the encrypted first key with a private key of the private key-public key pair, thereby recovering the first key; and
responsive to recovering first key, decrypting the encrypted service instance.

31. The method of claim 30, further including the steps of:
generating a key authenticator using at least a portion of the key validator;
associating the key authenticator with the encrypted first key and with the key validator; and
storing the key authenticator in the storage device;
wherein the step of determining whether the encrypted first key is valid, further includes the steps of:
retrieving the key authenticator from the storage device; and
determining whether the key validator is authentic using the key authenticator, wherein the encrypted first key is valid only if the key validator is authentic.

32. The method of claim 31, wherein the key authenticator includes a signed first HASH digest, the first HASH digest being the output of a HASH function having at least a portion of the key validator as an input, wherein the first HASH digest was signed by the private key, and the step of determining whether the key validator is authentic includes the steps of:
generating a second HASH digest using at least a portion of the key validator as an input to a HASH function;
decoding the signed first HASH digest with the public key; and
comparing the decoded first HASH digest with the second HASH digest, wherein the key validator is authentic only if the decoded first HASH digest is the same as the second HASH digest.

33. The method of claim 30, wherein the service instance received at the receiver includes ciphertext, and prior to encrypting the service instance, further including the step of:
receiving a decryption key token at the receiver, wherein the decryption key token is received concurrently with the service instance;
generating a fourth key using the decryption key token; and
decrypting the ciphertext of the service instance using the fourth key.

34. The method of claim 30, wherein the time indicator includes a starting time and an ending time for which the first key is valid.

35. The method of claim 30, wherein the time indicator includes a time specifier and a range specifier, wherein the first key is valid for times between the time specifier and the time specifier plus the range specifier.

36. The method of claim 30, wherein the time indicator includes a time specifier and a range specifier, wherein the first key is valid for times between the time specifier minus the range specifier and the time specifier.

37. In a subscriber television system having a head-end and a receiver that receives a service instance from the head-end, the receiver, the receiver comprising:
a first processor adapted to encrypt a service instance with a first key and adapted to encrypt the first key with a public key of a public key-private key pair belonging to the receiver, thereby converting the first key into an encrypted first key, the first processor further adapted to generate a key validator having a time indicator included therein;

storage means in communication with the first processor, the storage means adapted to store the encrypted first key, the encrypted service instance and a key authenticator;

a secure element in communication with the first processor, the secure element having a second processor and a memory, the memory having the private key belonging to the receiver stored therein, the second processor adapted to generate a key authenticator using at least a portion of the key validator and the public key belonging to the receiver, wherein the memory of the secure element is not accessible to the first processor;

an input port in communication with the first processor adapted to receiver commands from a subscriber input device, wherein responsive to a command from the subscriber input device received at the input port, the first processor determines whether the encrypted first key is valid using the key validator, the second processor decrypts the encrypted first key using the private key, thereby recovering the first key, and determines whether the key validator is authentic using the private key and the key validator, and responsive to both the first key being valid and the key validator being authentic, the first processor decrypts the service instance using the recovered first key;

a transceiver in communication with the first processor and the headend of the subscriber television system, wherein the first processor is adapted to duplicate the first key and encrypt the duplicate first key with a second public key, thereby converting the duplicate first key into a second encrypted first key, responsive to the encrypted first key being invalid, the first processor generates a message for the headend including the second encrypted first key and the transceiver transmits the message to the headend, wherein the transceiver receives a second message, responsive to the second message, the first processor decrypts the encrypted service instance, wherein the second message includes a second key validator, responsive to the second key validator, the first processor validates the first encrypted first key using the second key validator.

38. The receiver of claim 37, wherein the time indicator includes a starting time and an ending time for which the first key is valid.

39. The receiver of claim 37, wherein the time indicator includes a time specifier and a range specifier, wherein the first key is valid for times between the time specifier and the time specifier plus the range specifier.

40. The receiver of claim 37, wherein the time indicator includes a time specifier and a range specifier, wherein the first key is valid for times between the time specifier minus the range specifier and the time specifier.

41. The receiver of claim 37, wherein the second processor is further adapted to generate a HASH digest of at least a portion of the key validator and at least a portion the first key, wherein the key authenticator includes the HASH digest signed by the private key.

42. The receiver of claim 41, wherein the second processor is further adapted to generate a second HASH digest of at least a portion of the key validator and at least a portion the recovered first key, decode the signed HASH digest of the key authenticator using the public key, and compare the second HASH digest with the decoded HASH digest, wherein responsive to the second HASH digest being the same as the decoded HASH digest, the second processor provides the recovered first key to the first processor.

43. The receiver of claim 42, wherein responsive to the second HASH digest not being the same as the decoded HASH digest, the second processor does not provide the recovered first key to the first processor.

44. The receiver of claim 37, wherein the storage means includes a harddrive.

45. The receiver of claim 37, wherein the storage means includes a storage device external to the receiver.

46. In a subscriber network system having a head-end and a receiver that receives a service instance from the head-end, the receiver, which is located remotely from the head-end, stores the service instance at the remote location and restricts access to the stored service instance, the receiver comprising:

a port adapted to receive the service instance, wherein the service instance is provided to the subscriber network by an entitlement agent having a public key-private key pair associated therewith, the memory having the public key associated with the entitlement agent stored therein, and the processor is further adapted to copy the first key and encrypt the copy of the first key with public key associated with the entitlement agent and provide the encrypted copy of the first key to the storage device, which stores the encrypted copy of first key therein;

a storage device at the remote location, the storage device having an encrypted first key, a key validator, and key authenticator stored therein, and wherein the first key is used for decrypting the service instance when the first key is valid;

a memory having a private key-public key pair for the receiver stored therein;

a processor in communication with the memory, the processor adapted to use the public key of the receiver to encrypt the first key and generate the key validator and the key authenticator, wherein the key validator includes a time indicator used for determining whether the first key is valid or has expired, the key authenticator includes a hash digest signed by the private key of the receiver, and the hash digest is the output of a hash function having as inputs at least a portion of the key validator and at least a portion of the first key; and a transceiver in communication with the processor adapted to transmit messages to the head-end, wherein the processor is further adapted to generate a message having the encrypted copy of the first key included therein, and the transceiver transmits the message to the head-end, wherein the transceiver receives message from the head-end, the received message includes an encrypted second copy of the first key, and the processor decrypts the encrypted second copy of the first key using the private key of the receiver, wherein the received message includes a second key validator, the processor uses the second key validator to generate a second key authenticator, and the second key validator and the second key authenticator are stored in the storage device.

47. The receiver of claim 46, further including:

a decryptor in communication with the processor and the storage device, the decryptor adapted to use the first key to decrypt the encrypted stored service instance; and wherein the processor is adapted to use the encrypted first key, the key validator and the key authenticator to determine whether the decryptor should be provided with the first key.

48. The receiver of claim 47, wherein the processor is further adapted to decrypt the encrypted first key using the private key of the receiver and generate a second hash digest using at least a portion of the first key and at least a portion of the key validator as inputs to the hash function, use the public key of the receiver to process the authentication token, compare the second hash digest with the processed authentication token, and responsive to the second hash digest and the processed authentication token not being the same, the processor determines therefrom that the decryptor is not to be provided with the first key.

49. The receiver of claim 48, wherein the processor is further adapted to use the time specifier of the key validator to determine whether the first key has expired and when the first key is expired determine therefrom that the decryptor is not to be provided with the first key.

50. In a subscriber television system having a head-end and a receiver that receives a service instance from the head-end, the receiver, which is located remotely from the head-end at a subscriber's premises restricts access to the stored service instance, a method of accessing the restricted service instance, the method implemented at the receiver and comprising the steps of:

receiving the service instance;
duplicating the first key;
encrypting the service instance with a first key;
storing the encrypted service instance in a storage device at the premises of the subscriber;
encrypting the first key with a second key, thereby converting the first key to an encrypted first key, wherein the second key is a public key of a private key-public key pair belonging to the receiver;
encrypting the duplicate first key with a third key, wherein the third key is a public key provided to the receiver from the head-end of the subscriber television system;
storing the encrypted duplicate first key;
associating a key validator with the encrypted first key, wherein the key validator includes a time indicator that indicates whether the encrypted first key is valid;
associating a key authenticator with the encrypted first key, wherein the key authenticator includes a digest signed by the private key and indicates whether the key validator is authentic;
storing the encrypted first key, the key validator, and the key authenticator;
determining whether the encrypted first key is valid using the key validator;
authenticating the key authenticator using the key authenticator;
responsive to the encrypted first key being valid, transmitting the encrypted duplicate first key to the headend;
receiving from the head-end a second key validator;
validating the encrypted first key using the second key validator;
responsive to the encrypted first key being valid using the second key validator, decrypting the encrypted first key with the private key of the receiver, thereby recovering the first key; and
decrypting the encrypted service instance using the recovered first key.

51. The method of claim 50, wherein the digest of the key authenticator includes the HASH digest that is the output of a HASH function having as inputs at least a portion of the key validator and at least a portion of the first key.

52. The method of claim 51, wherein the step of authenticating further includes the steps of:

signing the HASH digest of the key authenticator with the public key of the receiver;
generating a second HASH digest using at least a portion of the key validator and at least a portion of the recovered first key as inputs; and
comparing the second HASH digest with the first HASH digest, wherein the key validator is authentic responsive to the first and second HASH digests being the same.

53. The method of claim 50, wherein the step of determining whether the first key is valid further includes the steps of:

determining a current time; and
determining from the current time and the time indicator of the key validator whether the first encrypted key is valid.

* * * * *